United States Patent
Nishio

(10) Patent No.: US 10,702,931 B2
(45) Date of Patent: Jul. 7, 2020

(54) DIMPLE PROCESSING METHOD USING ROTARY CUTTING TOOL

(71) Applicant: KANEFUSA KABUSHIKI KAISHA, Niwa-gun, Aichi (JP)

(72) Inventor: Satoru Nishio, Aichi (JP)

(73) Assignee: KANEFUSA KABUSHIKI KAISHA, Niwa-Gun, Aichi-Ken (JP)

( * ) Notice: Subject to any disclaimer, the term of this patent is extended or adjusted under 35 U.S.C. 154(b) by 133 days.

(21) Appl. No.: 16/301,785

(22) PCT Filed: May 15, 2017

(86) PCT No.: PCT/JP2017/018204
§ 371 (c)(1),
(2) Date: Nov. 15, 2018

(87) PCT Pub. No.: WO2017/199911
PCT Pub. Date: Nov. 23, 2017

(65) Prior Publication Data
US 2019/0151961 A1    May 23, 2019

(30) Foreign Application Priority Data
May 19, 2016   (JP) ................................. 2016-100404

(51) Int. Cl.
*B23C 3/34* (2006.01)
*B23C 5/10* (2006.01)
(Continued)

(52) U.S. Cl.
CPC .................. *B23C 3/34* (2013.01); *B23C 3/00* (2013.01); *B23C 3/02* (2013.01); *B23C 5/10* (2013.01);
(Continued)

(58) Field of Classification Search
CPC . Y10T 409/303752; Y10T 409/303808; B23C 3/34; B23C 2220/04; B23C 2220/36; B23C 2220/48; B44B 3/02
(Continued)

(56) References Cited

U.S. PATENT DOCUMENTS 2,890,627 A * 6/1959 Onksen ..................... B23C 3/20
409/132
3,247,766 A * 4/1966 Ennemond ................ F28F 1/34
409/131
(Continued)

FOREIGN PATENT DOCUMENTS

CN      101398494 A  *  4/2009
DE      102009052642 A1 *  5/2011
(Continued)

OTHER PUBLICATIONS

English Translation of the Written Opinion of the International Search Authority, PCT/JP2017/018204, dated Aug. 8, 2017, 5 pages.*
(Continued)

*Primary Examiner* — Erica E Cadugan
(74) *Attorney, Agent, or Firm* — Conley Rose, P.C.

(57) ABSTRACT

A method for forming dimples on a workpiece includes providing a rotary cutting tool. The rotary cutting tool includes a cutting edge that protrudes in a leading direction parallel to a longitudinal axis of the tool. The cutting edge extends from a position at the leading end of the rod-shaped main body that is radially offset from the longitudinal axis. The rotary cutting tool is set such that the longitudinal axis of the rotary cutting tool is inclined relative to a line perpendicular to the processing surface of the workpiece. The rotary cutting tool is moved along the processing surface while the rotary cutting tool is rotated about the axis. The processing surface is cut by the cutting edge to form the
(Continued)

dimples, which are spaced apart from each other on the processing surface.

20 Claims, 24 Drawing Sheets

(51) Int. Cl.
    *B23C 3/00*     (2006.01)
    *B23C 5/12*     (2006.01)
    *B23C 3/02*     (2006.01)
    *B23C 5/14*     (2006.01)

(52) U.S. Cl.
    CPC .................. *B23C 5/12* (2013.01); *B23C 5/14* (2013.01); *B23C 2210/0407* (2013.01); *B23C 2220/04* (2013.01); *B23C 2220/36* (2013.01); *Y10T 407/1948* (2015.01); *Y10T 409/303808* (2015.01)

(58) Field of Classification Search
    USPC .................................................. 409/131–132
    See application file for complete search history.

(56) References Cited

U.S. PATENT DOCUMENTS

| | | | | |
|---|---|---|---|---|
| 8,443,704 | B2 * | 5/2013 | Burke .................. | B23Q 15/007 82/1.11 |
| 2012/0096999 | A1 * | 4/2012 | Hyatt ...................... | B23B 3/22 82/1.11 |
| 2012/0207869 | A1 * | 8/2012 | Imai .......................... | B28D 5/02 425/175 |
| 2014/0007748 | A1 * | 1/2014 | Bhapkar ................... | B23B 5/36 82/1.11 |
| 2016/0263667 | A1 * | 9/2016 | Yajima ...................... | B23C 5/10 |

FOREIGN PATENT DOCUMENTS

| | | | | |
|---|---|---|---|---|
| EP | 1927444 | A2 | * | 6/2008 |
| EP | 2832494 | A | | 2/2015 |
| JP | 08-011223 | A | * | 1/1996 |
| JP | H1052998 | A | | 2/1998 |
| JP | 2002361510 | A | | 12/2002 |
| JP | 2003084370 | A | | 3/2003 |
| JP | 2003-236809 | A | * | 8/2003 |
| JP | 2007021692 | A | | 2/2007 |
| JP | 2008246587 | A | | 10/2008 |

OTHER PUBLICATIONS

European Extended Search Report dated Dec. 18, 2019, for European Application No. 17799335.9 (7 p.).
PCT/JP2017/018204 International Search Report and Written Opinion dated Aug. 8, 2017 (8 p.).
Japanese Office Action dated Jul. 29, 2019, for Japanese Application No. 2018-518285 (3 p.).
English Translation of Japanese Office Action dated Jul. 29, 2019, for Japanese Application No. 2018-518285 (4 p.).

* cited by examiner

DIMPLE PROCESSING METHOD USING ROTARY CUTTING TOOL

CROSS-REFERENCE TO RELATED APPLICATIONS

The present application is a 35 U.S.C. § 371 National Phase entry of, and claims priority to, PCT Application No. PCT/JP2017/018204, filed May 15, 2017, which in turn claims priority to Japanese Patent Application No. 2016-100404, filed May 19, 2016, both of which are hereby incorporated herein by reference in their entireties for all purposes.

STATEMENT REGARDING FEDERALLY SPONSORED RESEARCH OR DEVELOPMENT

Not applicable.

BACKGROUND

The present disclosure relates to a dimple processing method for forming dimples on the surface of a workpiece by using a rotary cutting tool to make small recesses on the surface.

A plurality of dimples in the form of small recesses may be formed on the surface of a workpiece that may be made of aluminum, copper alloy, casted product thereof, cast iron, resin, or the like. The plurality of dimples may form, as an example, a satin finish on the surface of the workpiece. The dimples may be formed on the workpiece to reduce the frictional resistance between the workpiece and a counter piece in contact with the workpiece. The principle is described as follows: when the workpiece comes in contact with the counter piece, abrasion powders are generated between the workpiece and the counter piece, and increase the frictional resistance. With dimples are formed as recesses on the surface of the workpiece, the abrasion powders may be retained in the dimples, thereby limiting the increase in frictional resistance caused by the generation of the abrasion powders. Dimples may also be employed when oil is poured between the workpiece and the counter piece so that oil can fill and gather in the dimples. In this case, when the counter piece passes near the dimples, the oil is discharged from the dimples and enters into the space between the counter piece and the workpiece, due to a high pressure squeezing effect. This pressure may prevent the counter piece from coming into contact with the workpiece, thereby reducing the frictional resistance between the counter piece and the workpiece.

Dimples may be formed on an inner wall of a cylinder for an engine, or an inner wall of a tubular member for a turbocharger etc., or a joining face of an artificial joint or the like. Methods for processing dimples such as a method using laser irradiation, as well as a method using shot peening in which microbeads collide with a workpiece at high speed are known in the art. When using the laser irradiation method, the workpiece is heated at a high temperature, which may apply of a large amount of thermal stress to the workpiece, or dross (molten material) adhering to the workpiece. It may be difficult to remove any bulging portions or dross portions that are formed by the laser. When adopting the shot peening method, the area around dimples may bulge so that the workpiece may not be flat. In addition, residual stress may be generated around the dimples and may cause deformation or breakage of the workpiece.

Japanese Laid-Open Patent Publication No. 10-052998 discloses a method for decorating a surface of a workpiece using a rotary cutting tool, such as a milling cutter, end mill cutter, or the like. In this method, the cutting edge of a rotary cutting tool is brought into contact slightly with the surface of the workpiece, while rotating the rotary cutting tool. In this way, for example, a polka-dot pattern with a plurality of circles can be formed on the surface of the workpiece. The circles are arranged parallel to the longitudinal axial direction of the rotary cutting tool and are formed at equal intervals in the feed direction orthogonal to the axial direction.

There has conventionally been a need for reducing frictional resistance more uniformly through the use of dimples. For this need, for example, a processing method, that easily allows the formation of a plurality of very small dimples, is desired. Further, there has also been a need to prevent burrs from being built around the dimples, and to maintain the area surrounding the dimples as flat. Therefore, a method for processing a plurality of, for example, very small dimples by a rotary cutting tool has been conventionally needed.

BRIEF SUMMARY

One aspect of the present disclosure relates to a dimple processing method for forming dimples on a workpiece by using a rotary cutting tool. A rotary cutting tool has a cutting edge axially projecting from a leading end of a rod-shaped main body and from a location offset from a longitudinal axis of the rotary cutting tool. The rotary cutting tool is set such that the longitudinal axis of the rotary cutting tool is inclined with respect to a vertical line of a processing surface of the workpiece. The rotary cutting tool and the workpiece are oriented such that the rotary cutting tool moves along the processing surface of the workpiece while the rotary cutting tool rotates about the longitudinal axis of the rotary cutting tool. Spaced apart dimples are formed on the processing surface by the cutting edge of the rotary cutting tool cutting the processing surface of the workpiece.

The rotary cutting tool is formed with a rod-shape and has an axially projecting cutting edge at its leading end. Consequently, it is possible to rotate the cutting edge with a small diameter compared to a tool with a radially projecting cutting edge. As a result, small dimples can be formed by the cutting edge. The cutting edge projects from a location offset from the longitudinal axis of the leading end of the main body. Therefore, the cutting edge cuts the processing surface and moves away from the processing surface when the rotary cutting tool rotates with an inclined degree relative to the processing surface of the workpiece. In this way, a plurality of spaced apart dimples can be easily formed.

DETAILED DESCRIPTION

Figure 1:
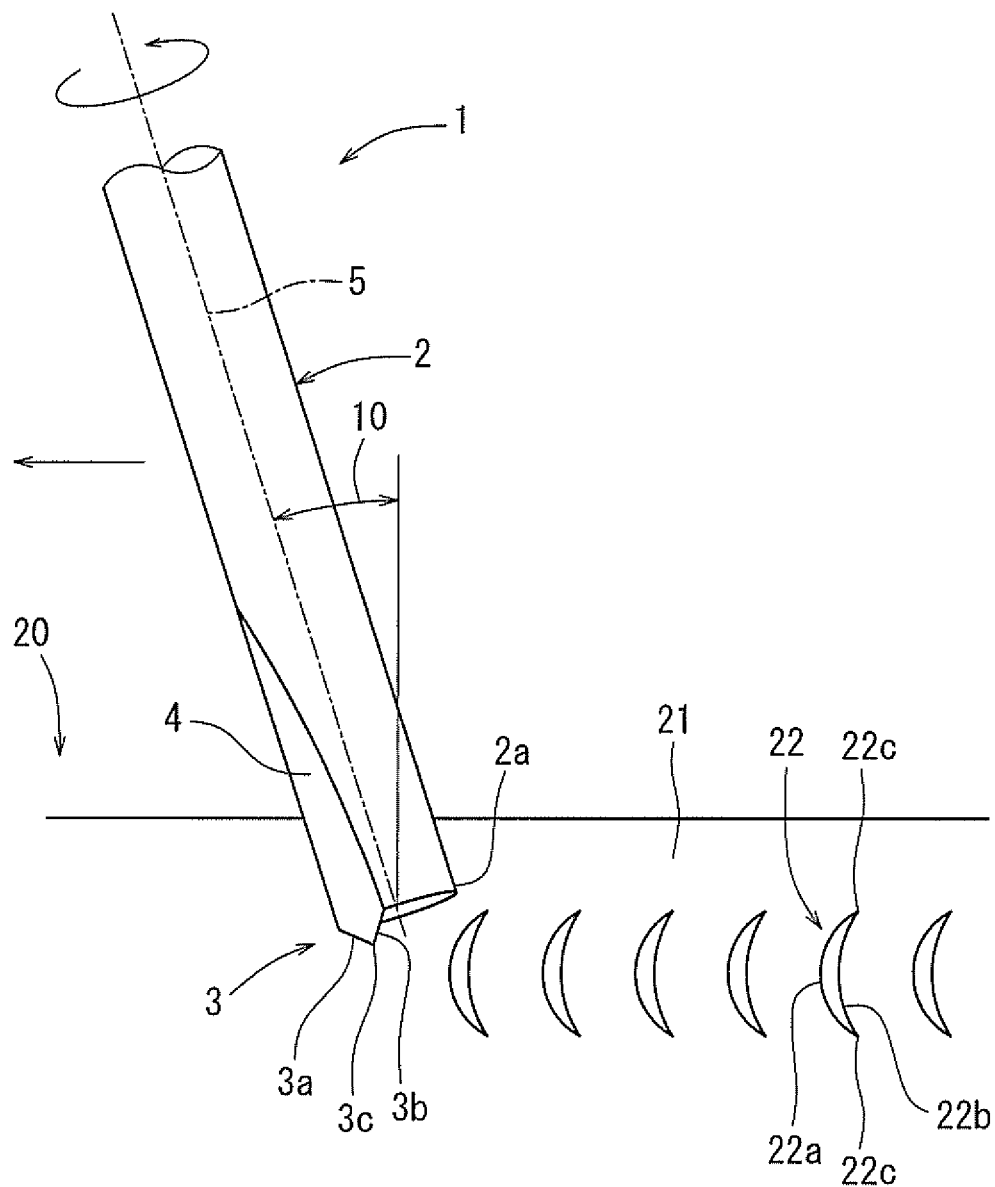
FIG. 1 is a front view of an embodiment of a rotary cutting tool that forms dimples on a workpiece.

One exemplary embodiment according to the present disclosure will be described with reference to FIGS. 1 to 12. A rotary cutting tool 1 illustrated in FIG. 1 is a rotary cutting tool for forming a plurality of dimples (small recesses) spaced apart from each other on the processing surface of a workpiece. The rotary cutting tool 1 includes a rod-shaped main body 2 and a cutting edge (end cutting edge) 3 projecting from the leading end 2a of the main body 2. The main body 2 has a rod or a columnar shape with a diameter of 2 to 10 mm, for example 4 mm. The main body 2 has a leading end (bottom surface) 2a extending substantially orthogonal to its longitudinal axis 5. The longitudinal axis 5 of main body 2 is located in the radial center of the transverse cross-sectional face of the main body 2, and extends in the longitudinal direction of main body 2.

Figure 2:
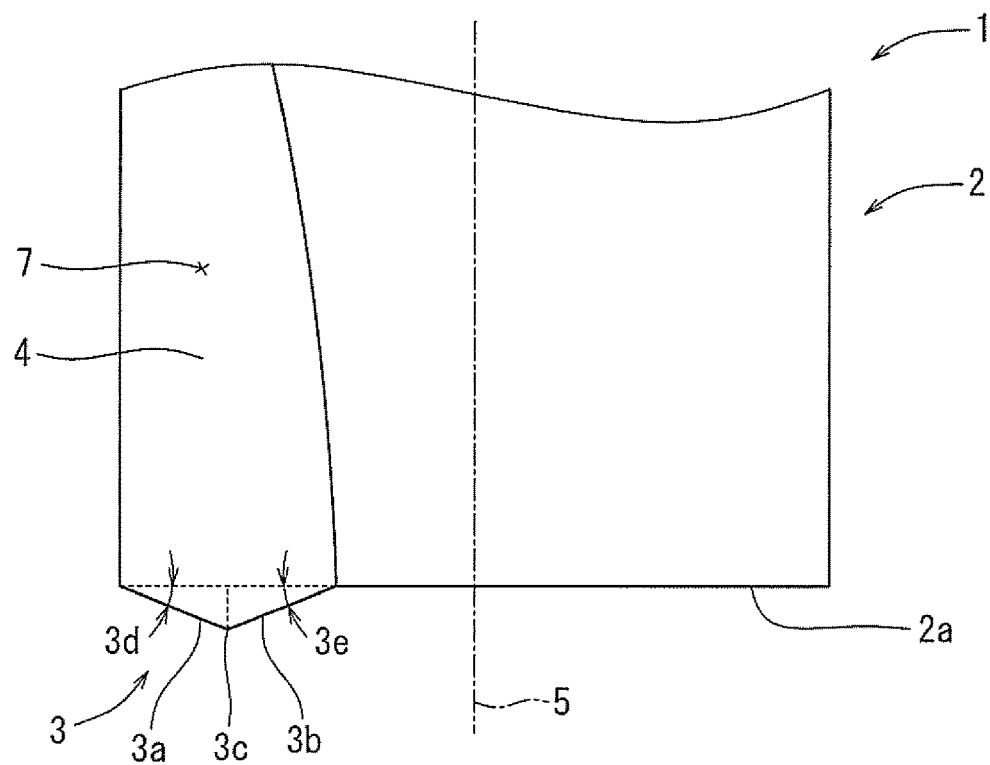
FIG. 2 is an enlarged front view of a leading end of the rotary cutting tool of FIG. 1.
Figure 3:
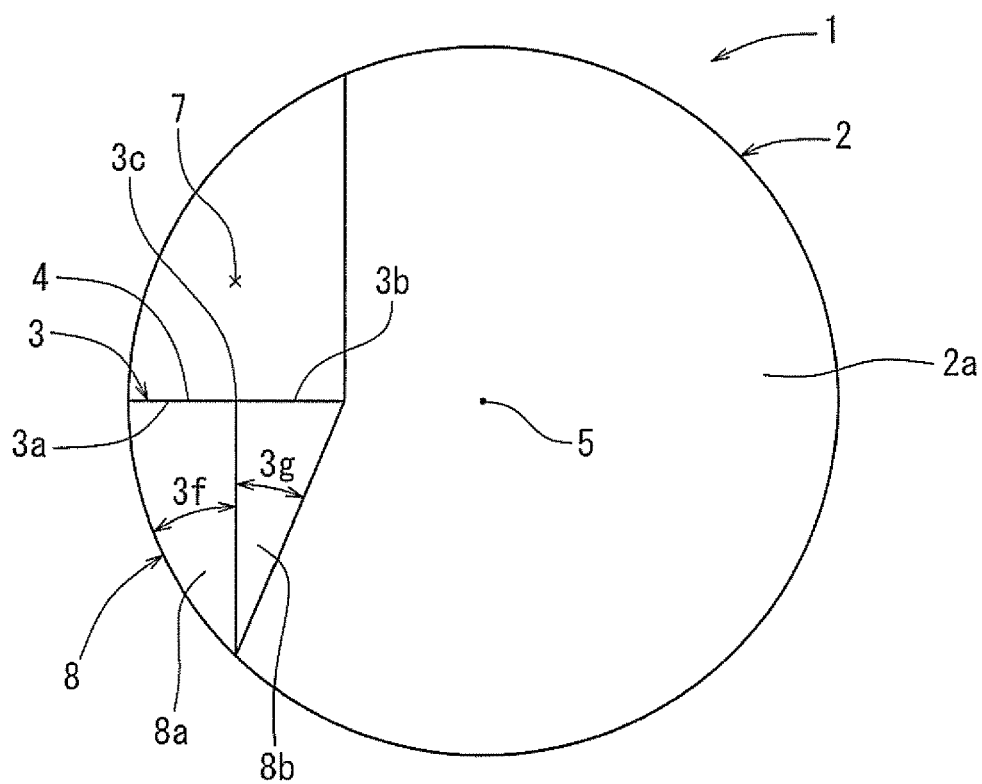
FIG. 3 is an enlarged bottom view of the leading end of the rotary cutting tool of FIG. 1.

As illustrated in FIGS. 2 and 3, the cutting edge 3 is positioned at a location offset from the axis 5 of the main body 2 in the radial direction, and axially extends further in the longitudinal direction than the leading end 2a of the main body 2. The cutting edge 3 is continuously formed with a groove (flute) 7 on the main body 2, and axially extends from the leading end of the groove 7. The cutting edge 3 has a substantially triangular shape and includes a first end cutting edge 3a located on the radially outer side and a second end cutting edge 3b located on a radially inner side. The first end cutting edge 3a extends straight and diagonally from an outer peripheral edge of the leading end 2a of the main body 2, from the vicinity of the outer peripheral edge in both the leading direction along the longitudinal axis of tool 1, as well as toward the axis 5. As shown in FIG. 2, the first end cutting edge 3a forms a first angle 3d with respect to a plane orthogonal to the longitudinal axis 5 of tool 1.

As illustrated in FIG. 2, the second end cutting edge 3b is positioned immediately adjacent to and radially inward of the first end cutting edge 3a, between the first end cutting edge 3a and the axis 5. The second end cutting edge 3b extends straight and diagonally from the interior of the leading end 2a of the main body 2 in both the leading direction along the longitudinal axis of tool 1, as well as toward the outer peripheral edge which first end cutting edge 3a extends from. The second end cutting edge 3b forms a second angle 3e with respect to the same plane orthogonal to the longitudinal axis 5 of tool 1. The first angle 3d and the second angle 3e are acute angles, for example, 1 to 30 degrees, with a preferable angle of 15 degrees. The first end cutting edge 3a and the second end cutting edge 3b are connected at an end cutting edge peak 3c at an angle.

As illustrated in FIGS. 2 and 3, the cutting edge 3 has a rake face 4 on a plane continuous with the bottom of the groove 7 in the plane of the interior circular cross-section of tool 1 orthogonal to the longitudinal axis 5 at leading end 2a. In the same plane, as shown in FIG. 3, the cutting edge 3 includes a flank 8 on the opposite side of the rake face 4. The flank 8 includes a first flank 8a extending from the first end cutting edge 3a and a second flank 8b extending from the second end cutting edge 3b. The first flank 8a extends diagonally from the first end cutting edge 3a to the leading end 2a of the main body 2 along the circumference of the plane described above. The second flank 8b has a substantial triangular shape and extends diagonally from the second end cutting edge 3b toward the leading end 2a of the main body 2 along the circumference of the plane described above. The first flank 8a forms a first angle 3f with respect to a vertical ridge line between the first flank 8a and the second flank 8b in the interior circular plane of tool 1 orthogonal to the longitudinal axis 5 at the leading end 2a. The second flank 8b forms a second angle 3g with respect to the ridge line. The first angle 3f and the second angle 3g are determined such that the face of the workpiece cut by the tool 1 does not interfere with the first flank 8a and the second flank 8b when the rotary cutting tool 1 is moved with respect to the workpiece 20. For example, the first angle 3f and the second angle 3g are 20±10 degrees when the first flank 8a and the second flank 8b are projected onto a plane orthogonal to the axis 5 as shown in FIG. 3.

The cutting edge 3 may be formed from the same material as that of the main body 2 of the rotary cutting tool 1, or alternately it may be formed from a different material. For example, the cutting edge 3 and the main body 2 may be formed from tool steel, high speed steel (high speed tool steel) or cemented carbide. Alternatively, the main body 2 may be formed from carbon steel, stainless steel, tool steel, high speed steel or cemented carbide, while the cutting edge 3 may be formed from polycrystalline diamond (PCD), cubic boron nitride (CBN) or ceramics, wherein the cutting edge 3 would be joined to the main body 2 in a composite construction. Further alternatively, the cutting edge 3 is formed from the same material as or different from that of the main body 2, and a surface treatment such as coating may be applied to a region corresponding to the cutting edge 3. The surface treatment may be applied, for example, by chemical vapor deposition (CVD), physical vapor deposition (PVD), or the like, and a coating layer of Ti-based, for example, TiAlN, TiAlCrN, TiAlCrSiN or a CVD diamond, diamond like carbon (DLC) may be applied to the cutting edge 3.

Figure 4:
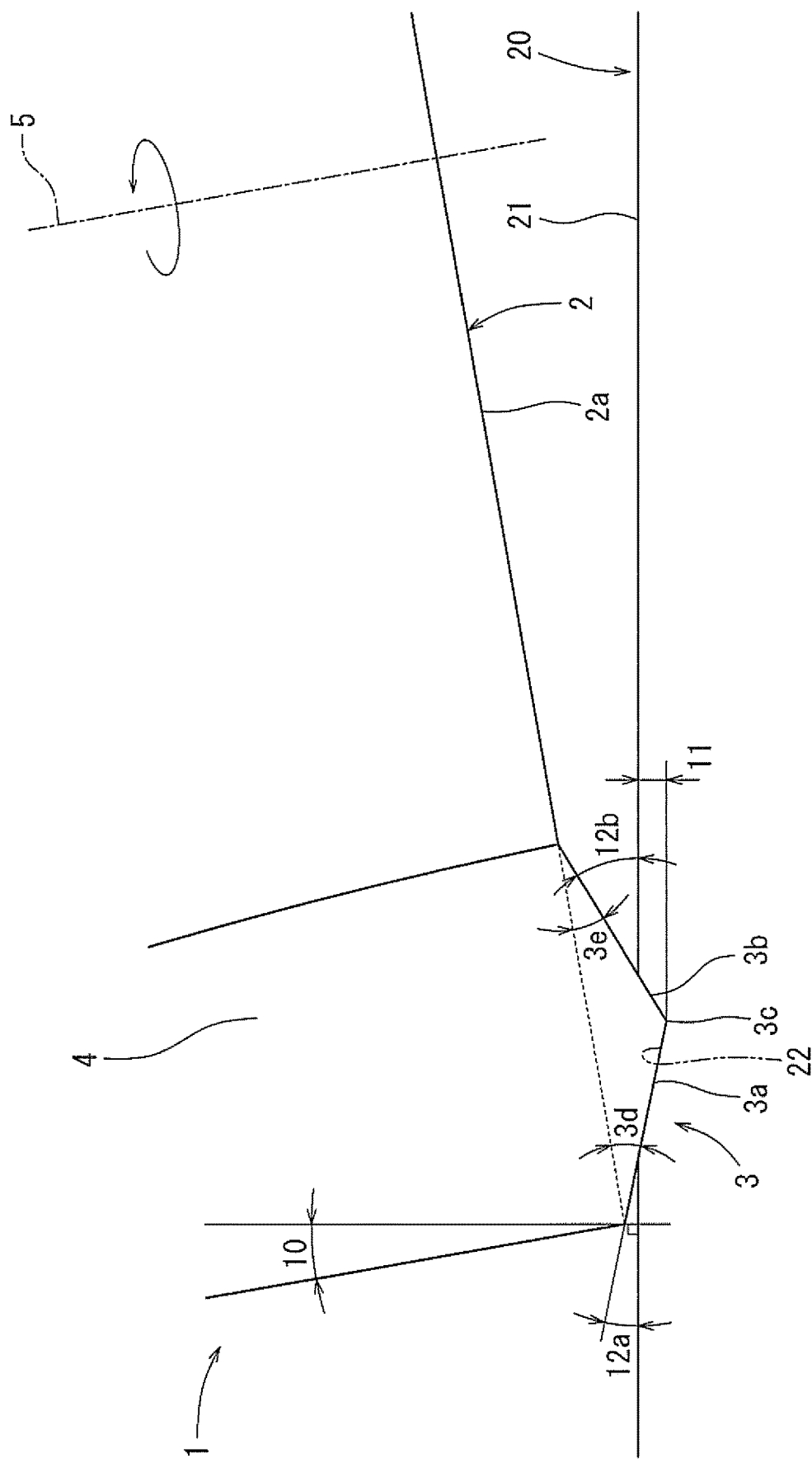
FIG. 4 is an enlarged front view of the rotary cutting tool of FIG. 1 near the cutting edge.

As illustrated in FIGS. 1 and 4, the rotary cutting tool 1 is set such that the axis 5 has a predetermined counter-clockwise angle 10 with respect to a line oriented perpendicular to the processing surface 21 of the workpiece 20. The rotary cutting tool 1 is set such that the tip of the cutting edge 3 at the lowest point of the edge 3 is positioned so as to have a predetermined depth 11 relative to the processing surface 21. The rotary cutting tool 1 is rotated about the axis 5 and the cutting edge 3 cuts the processing surface 21 within the predetermined rotational angle region. In another rotational angle region, the cutting edge 3 gets away from the processing surface 21. In this way, the cutting edge 3 cuts the processing surface 21 in an intermittent, alternating manner. The cutting edge 3 forms one dimple per rotation of the rotary cutting tool 1.

Figure 5:
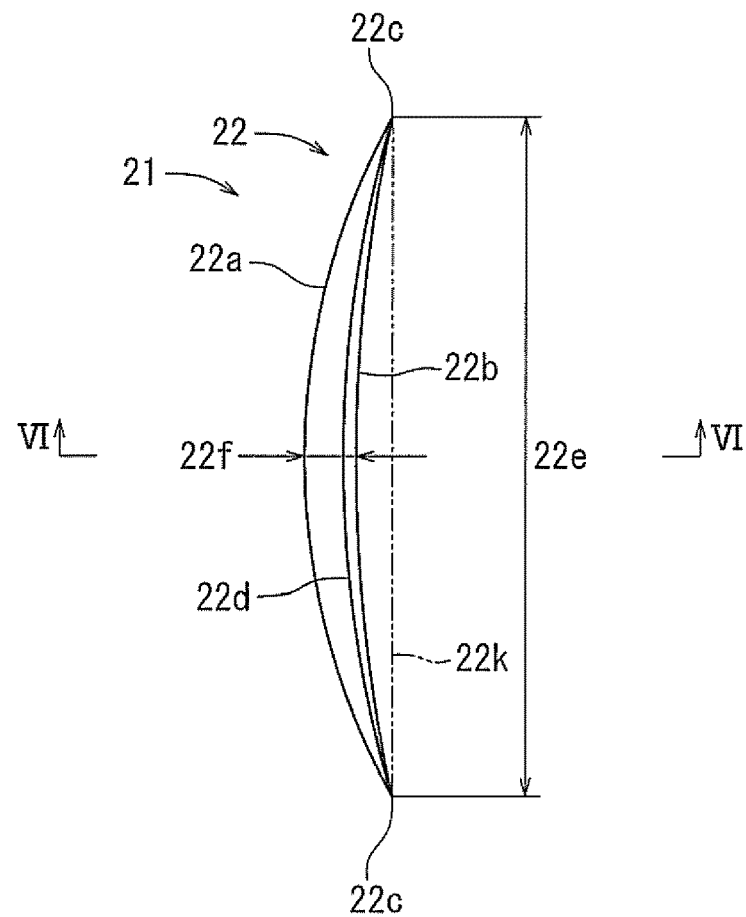
FIG. 5 is an enlarged top view of the workpiece of FIG. 1 illustrating one of the dimples formed in the workpiece with the rotary cutting tool of FIG. 1.

The counter-clockwise predetermined angle (inclined angle) 10 of the longitudinal axis 5 relative to the vertical line described above and as illustrated in FIGS. 1 and 4 is greater than 0 degrees. For example, the angle may be greater than or equal to 1 degree, greater than or equal to 2 degrees, or greater than or equal to 5 degrees, so that the cutting edge 3 is displaced relative to the processing surface 21. The predetermined angle 10 is less than or equal to 60 degrees, less than or equal to 45 degrees or less than or equal to 30 degrees such that the cutting edge 3 can cut the processing surface 21, preferably so that the dimple 22 has a predetermined length 22e as illustrated in FIG. 5. The predetermined depth 11 may be set so that the maximum depth of the dimple 22 is 0.1 to 0.001 mm, and more preferably 0.01 mm as illustrated in FIG. 6.

Figure 6:
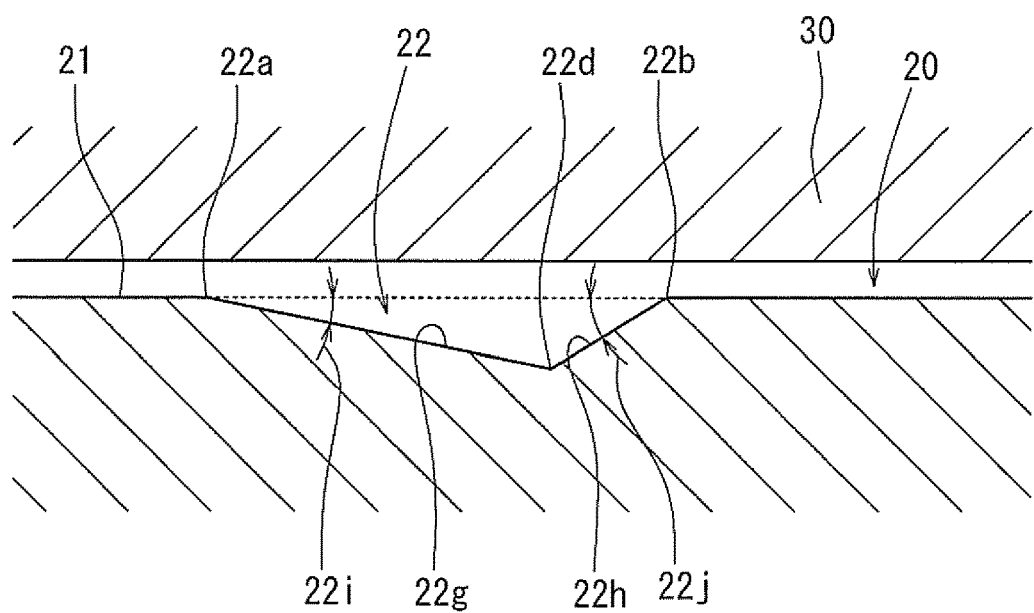
FIG. 6 is a cross-sectional view of the workpiece of FIG. 1 taken along section VI-VI in FIG. 5 and a counter piece opposed to the workpiece.

As illustrated in FIGS. 5 and 6, the dimple 22 is very small, and the length 22e in a cutting direction may be, for example, 0.5 to 1 mm. Referring to FIG. 1, the cutting direction is the direction in which the cutting edge 3 proceeds upon making contact with the processing surface 21, which is, for example, a direction connecting a point where a predetermined portion of the cutting edge 3 touches the processing surface 21 and a point where the predetermined portion gets away from the processing surface 21. The dimple 22 has a width measured perpendicular to the cutting direction. The maximum width 22f is located at approximately the center of the length 22e of the dimple 22, and is shorter than a length 22e, which is, for example, less than or equal to half of the length 22e. The maximum width 22f may be, for example, 0.01 mm to 0.5 mm.

As illustrated in FIG. 5, the dimple 22 has ends 22c, a first side 22a extending between ends 22c, and a second side 22b opposite to the first side 22a and extending between ends 22c. The first side 22a and the second side 22b are curved lines and aligned in the width direction. The first side 22a and the second side 22b bulge in the same direction. In other words, the first side 22a bulges between ends 22c toward one direction of the width (e.g. leftwards) and the second side 22b bulges, but to a lesser extent, in this same direction (i.e. in this example also leftwards). As a result, the dimple 22 has a crescent shape. The entirety of, or at least the majority of both the first side 22a and the second side 22b is located on one side of the line 22k extending linearly between ends 22c.

As illustrated in FIG. 6, the dimple 22 has an inclined surface 22g extending downward from the first side 22a toward a lowest point 22d, and a second inclined surface 22h extending upwards from the lowest point 22d towards the second side 22b. The first inclined surface 22g is oriented at a first depth angle 22i with respect to the processing surface 21 adjacent the dimple 22, and gradually extends downward from the processing surface and the first side 22a to the lowest point 22d. The second inclined surface 22h is oriented at a second depth angle 22j with respect to the processing surface 21 and gradually extends downward from the second side 22b to the lowest point 22d. The second depth angle 22j is greater than the first depth angle 22i. The dimple 22 has a groove bottom line 22d connecting the deepest points in the width direction. The groove bottom line 22d is located at a position closer to the second side 22b than the line which connects the centers of the dimple 22 in the width direction.

Figure 7:
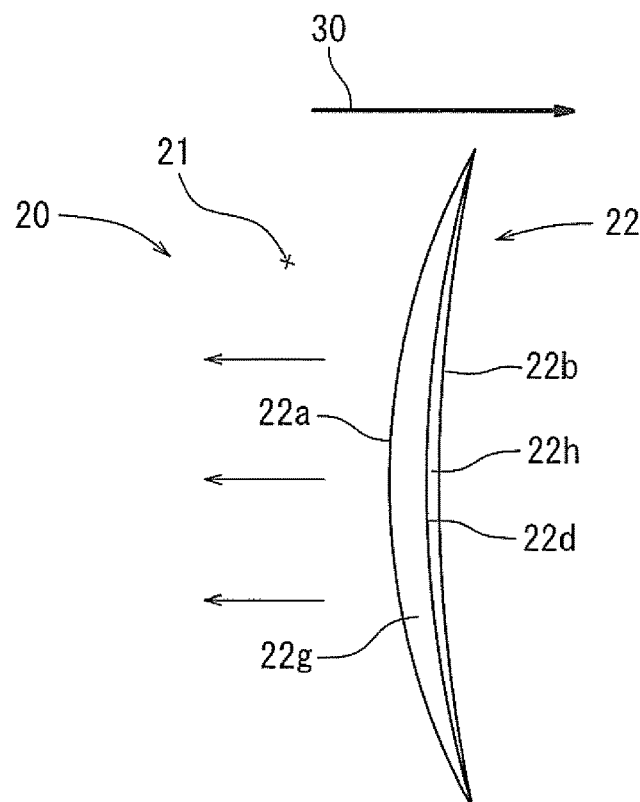
FIG. 7 is a schematic top view illustrating a moving direction of the counter piece relative to the workpiece of FIG. 6.

As illustrated in FIG. 7, the dimples 22 may reduce friction generated when the workpiece 20 having the dimples 22 and the counter piece 30 opposing the workpiece 20 are moved in opposite directions relative to each other. For example, when such movement occurs, abrasion powders may be generated from one of or both of these members, however, the abrasion powders may be deposited in the dimples 22 when, for example, the workpiece and the counter piece 30 slide. Most of the abrasion powders may be kept near the groove bottom line 22d.

As illustrated in FIG. 7, the workpiece 20 may be moved with respect to the counter piece 30 to one side in the width direction of the dimple 22. More specifically, the workpiece 20 may be moved with respect to the counter piece 30 in a direction where the first side 22a of the dimple 22 bulges. In this case, the abrasion powders move from the first side 22a to the second side 22b with respect to the dimple 22, following the movement of the counter piece 30. The second inclined surface 22h has a greater inclination angle than the inclination angle of the first inclined surface 22g, as seen in FIG. 6. Therefore, this steep angle aids in holding in the abrasion powders within the dimple, and thus, the abrasion powders may be effectively prevented from being discharged from the dimple 22 due to the second inclination surface 22h.

Figure 8:
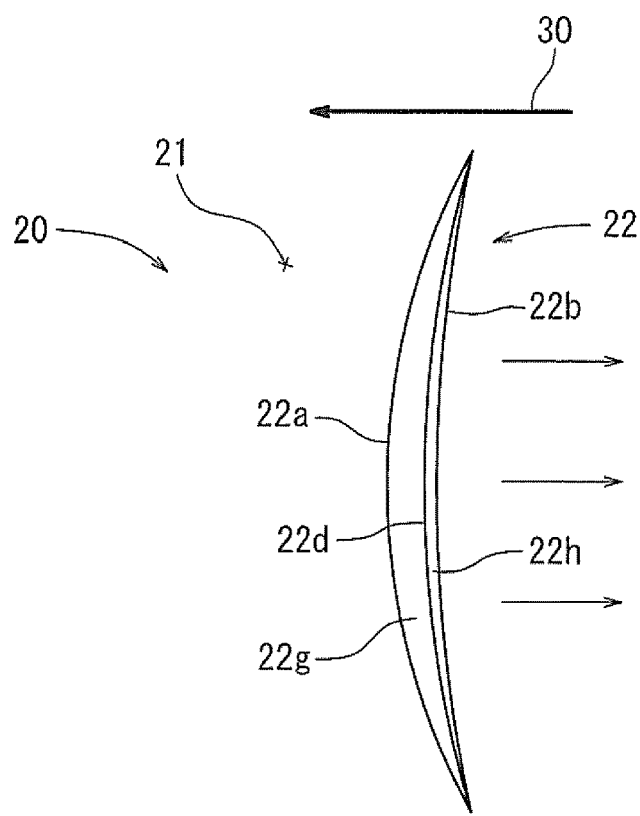
FIG. 8 is a schematic top view illustrating a moving direction of the counter piece relative to the workpiece of FIG. 6.

As illustrated in FIG. 8, conversely, the workpiece 20 may also be moved in the opposite direction with respect to the counter piece 30, to the other side in the width direction of the dimple 22. More specifically, the workpiece 20 may be moved in an opposite direction to the direction where the first side 22a of the dimple 22 bulges. In this case, grease passing through the dimples 22 is shifted from the second side 22b to the first side 22a, with respect to the dimple 22, following the movement of the counter piece 30.

The inclination angle of the first inclined surface 22g is less steep than that of the second inclined surface 22h. Therefore, when grease is retained in the dimple 22, the pressure of the grease gradually rises along the first inclined surface 22g. Due to the gradual and not steep inclination, the rate of pressure rising is smaller than when the pressure rises along the second inclined surface 22h. Therefore, with the first inclined surface 22g, the pressure loss is small and the pressure of the grease is reliably increased. As a result, the squeezing effect due to the pressure of grease, when the counter piece 30 and the workpiece 20 are moved in opposite directions, is increased such that the friction between the workpiece 20 and the counter piece 30 can be efficiently reduced.

Figure 9:
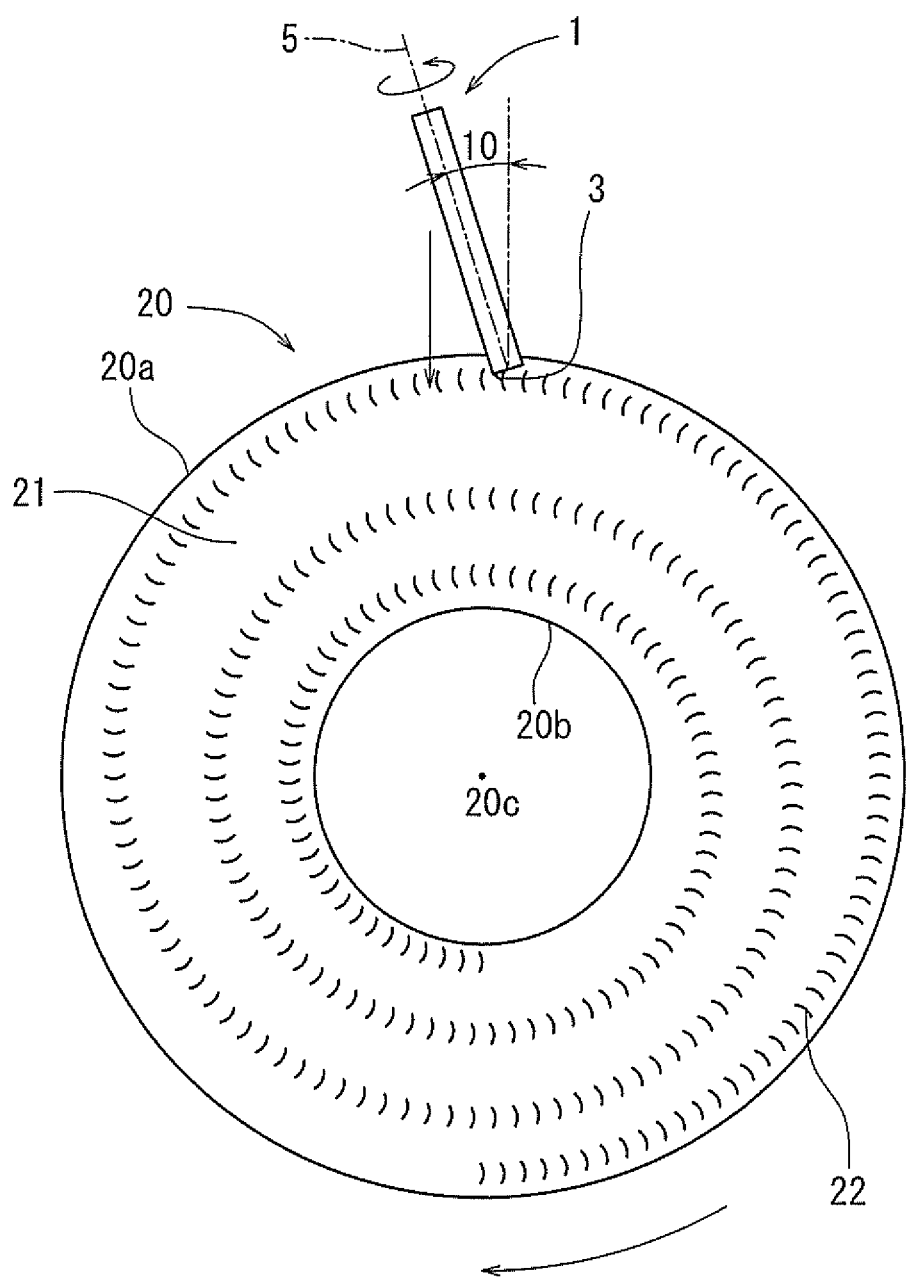
FIG. 9 is a top schematic view of the workpiece and the rotary cutting tool of FIG. 1.

The workpiece 20 may have a cylindrical shape as illustrated, for example, in FIG. 9, with an outer peripheral surface 20a and an inner peripheral surface 20b. The workpiece 20 may have a flat processing surface 21 at its top axial end, where a plurality of dimples 22 are formed on the processing surface 21. The plurality of the dimples 22 may be aligned in the circumferential direction, as well as the radial direction of the workpiece 20. The plurality of the dimples 22 are formed on the processing surface 21 to have, for example, a spiral shape and arranged in parallel in the circumferential direction as well as radial direction.

Figure 10:
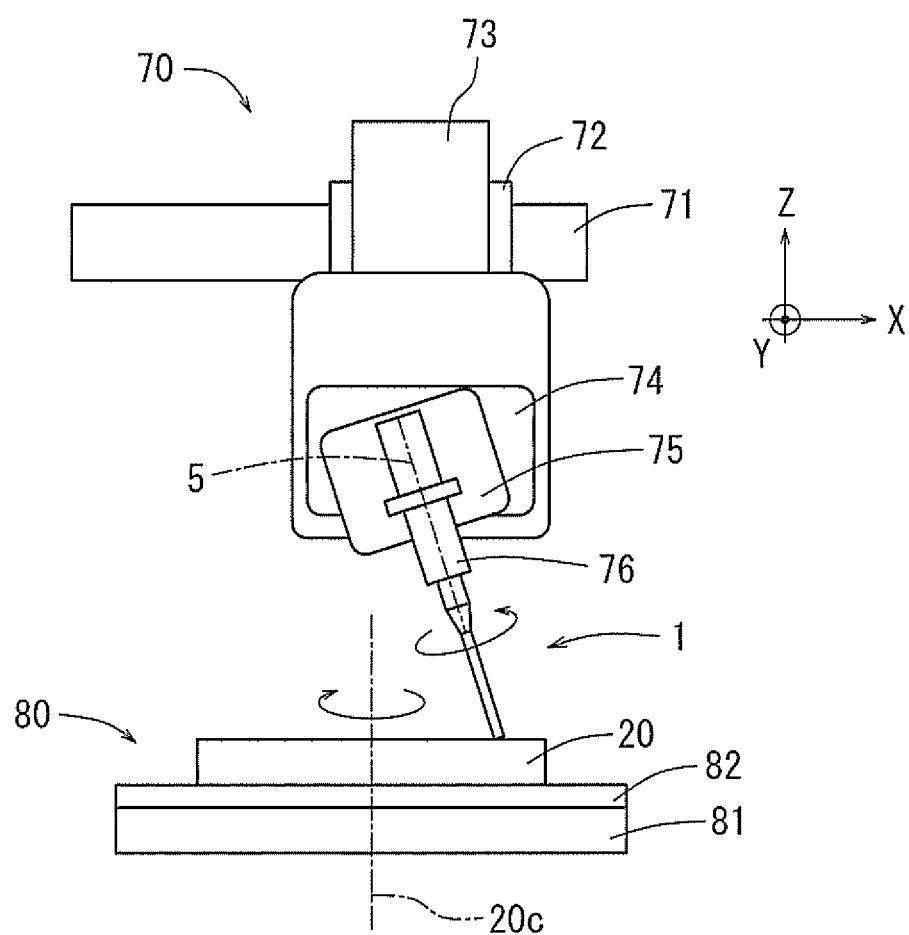
FIG. 10 is a schematic front view of an embodiment of a processing apparatus including the rotary cutting tool of FIG. 1.

As illustrated in FIG. 10, the rotary cutting tool 1 is attached to a processing apparatus 70. The processing apparatus 70 has an X-axis guide 71, an X-direction movable member 72, which is movable along the X-axis guide 71, a Y-direction movable member 73, which is movable in the Y-axis direction, and a Z-direction movable member 74, which is movable in the Z-axis direction. The X-axis guide 71 is supported on a supporting base (not illustrated) and extends in the X-axis direction. The X-axis direction, Y-axis direction, and Z-axis direction are orthogonal to one another.

The X-direction movable member 72 includes, for example, a nut member for a feed screw mechanism. The nut member moves relative to a threaded shaft provided on the X-axis guide 71 when rotated by a servo motor 96 (see FIG. 11). Alternatively, instead of a feed screw mechanism, the X-direction movable member 72 may move relative to the X-axis guide 71 by utilizing a rack pinion mechanism and a servo motor 96. The Y-direction movable member 73 and the Z-direction movable member 74 move relative to the X-direction movable member 72 in the Y and Z directions, respectively, by utilizing, for example, either a feed screw mechanism or rack pinion mechanism, and respective servo motors 97 and 98 (see FIG. 11).

Figure 11:
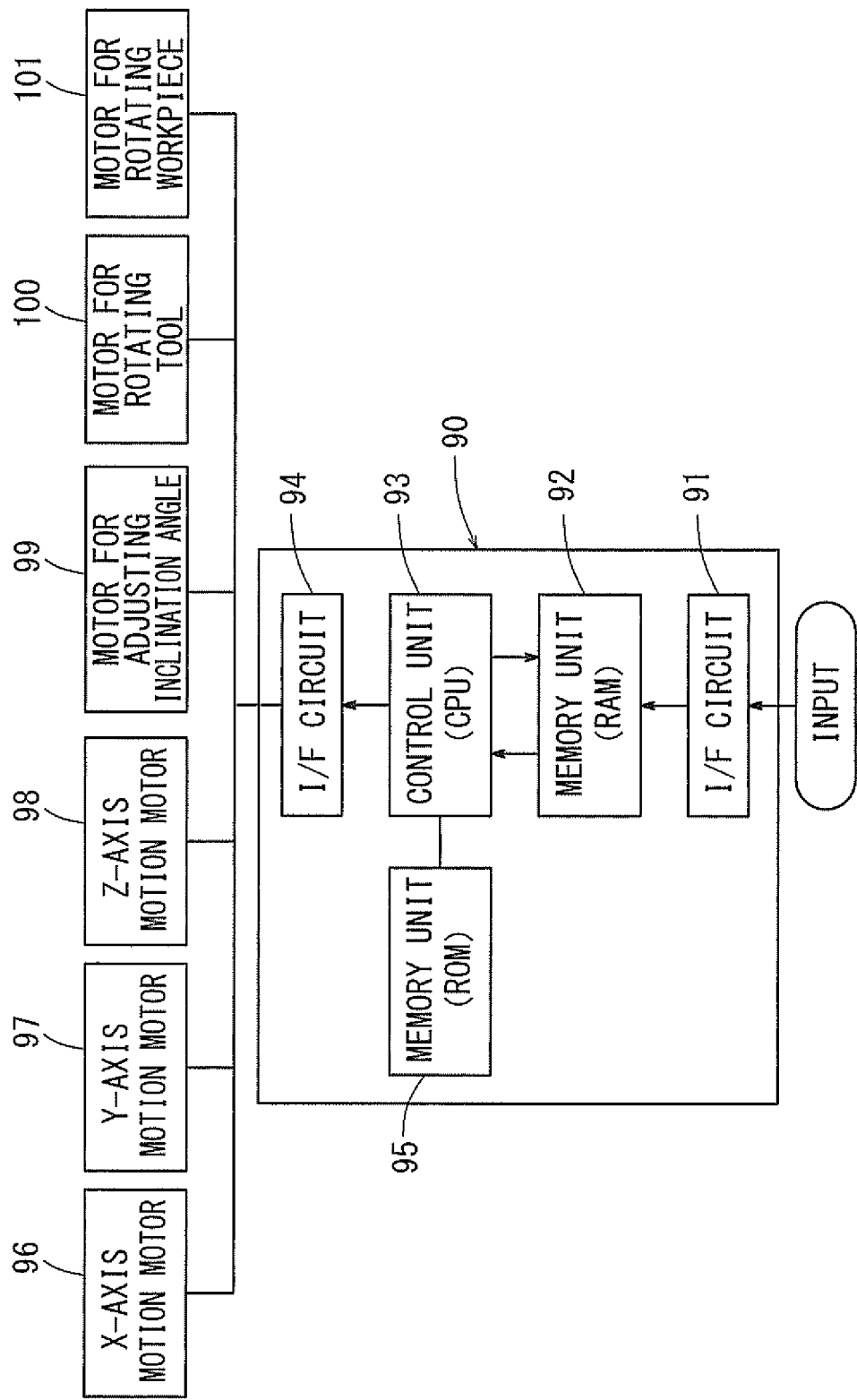
FIG. 11 is a block diagram of an embodiment of a controller for the processing apparatus of FIG. 10 and a workpiece holding apparatus.

As illustrated in FIG. 10, the processing apparatus 70 includes a swing member 75 that is attached to the Z-direction movable member 74 such that its angle may be adjusted. The processing apparatus 70 also includes a spindle 76 provided on the swing member 75 such that said spindle 76 is rotatable about the longitudinal axis 5. The swing member 75 swings in the X-direction or the Y-direction relative to the Z-direction movable member 74 utilizing a servo motor 99 (see FIG. 11). The rotary cutting tool 1 is attached to the spindle 76 and the spindle 76 rotates the rotary cutting tool 1 about the axis 5 utilizing the servo motor 100. The motion and rotation of each member for the processing apparatus 70 are controlled by the control unit 93 stored within a PC 90 as illustrated in FIG. 11.

As illustrated in FIG. 10, the workpiece 20 is supported on a workpiece holding apparatus 80. The workpiece holding apparatus 80 has a base 81 and a table 82. The table 82 is rotatably attached on an upper surface of the base 81. The table 82 may rotate relative to the base 81 utilizing a servo motor 101 (see FIG. 11). The workpiece 20, by virtue of being attached on the table 82, rotates with the table 82 about an axis 20c oriented perpendicular to the center of the workpiece 20 in the X direction, utilizing the servo motor 101. The servo motor 101 is controlled by the control unit 93 stored within the PC 90.

The motion control and the rotation control of each member for the processing apparatus 70 and the workpiece holding member 80 are controlled by the control unit (CPU) 93 within the PC 90 via an I/F circuit 94. Commands or data necessary for execution by the control unit 93 are stored in a ROM memory 95. Data relating to processing modes, coordinate location data of the workpiece 20, and data relating to number of rotations of the spindle 73, are input via a key board or the like and are stored in a memory unit (RAM) 92 via an I/F circuit 91. The control unit 93 transmits predetermined operation commands to each of the motors 96 to 101, based on programs executed according to the stored data, so that each of the motors 96 to 101 carries out predetermined operations from motion based on the transmitted signals.

As illustrated in FIGS. 1 and 9, the rotary cutting tool 1 is set such that the longitudinal axis 5 thereof is oriented at a counterclockwise predetermined angle 10 with respect to the line perpendicular to the processing surface 21. The position of the rotary cutting tool 1 in the depth direction (Z-direction) is determined by taking into account the cutting depth of the cutting edge 3 relative to the processing surface 21. Utilizing the table 82, the workpiece 20 is rotated at a predetermined rotational speed while rotating the rotary cutting tool 1 at a predetermined rotational speed. As these rotations are occurring, the rotary cutting tool 1 is moved from the outer peripheral surface 20a to the inner peripheral surface 20b of the workpiece 20 (as seen, for example in FIG. 9).

As illustrated in FIG. 9, the rotary cutting tool 1 rotates and the cutting edge 3 cuts the processing surface 21 so as to form one dimple 22 per rotation of the rotary cutting tool 1. After one dimple 22 is formed, the processing surface 21 rotates relative to the tool 1. The rotary cutting tool 1 then rotates again at a new location on the processing surface 21, and the cutting edge 3 forms another dimple 22. In this manner, a plurality of the dimples 22 are formed in a relatively spaced-apart manner.

As illustrated in FIGS. 1 and 9, the rotary cutting tool 1 is inclined relative to the rotational feed direction of the workpiece 20. As a result, by rotation of the rotary cutting tool 1, each of the dimples 22 are able to be formed such the longitudinal axis of each dimple 22 is substantially orthogonal to the rotational feed direction of the workpiece 20. The plurality of the dimples 22 are arranged in parallel in the rotational feed direction as well as the width direction. The rotary cutting tool 1 also is able to move in the radial direction with respect to the processing surface 21, for example, from the outer peripheral surface 20a to the inner peripheral surface 20b. Therefore, the plurality of the dimples 22 are arranged on the processing surface 21 in a spiral manner and are arranged in parallel, in both the circumferential direction as well as the radial direction.

The rotational speed of the rotary cutting tool 1, the rotational speed of the workpiece 20, and the movement speed of the rotary cutting tool 1 in the radial direction, can each be adjusted to form equal spacing of intervals between the plurality of spaced dimples 22 in the circumferential direction. For example, when the rotary cutting tool 1 is located in a position near the outer peripheral surface 20a of the workpiece 20, the rotary cutting tool 1 needs to be rotated at the high speed. However, as the rotary cutting tool 1 radially approaches the inner peripheral surface 20b of workpiece 20, the rotational speed of the rotary cutting tool 1 may be reduced to form the same circumferentially-spaced intervals.

More specifically, the workpiece 20 may be rotated at 17 rpm when the outer peripheral diameter of the workpiece 20 is 49 mm and the inner peripheral diameter is 13 mm. The rotary cutting tool 1 may be shifted from the vicinity of the outer peripheral surface 20a toward the inner peripheral surface 20b of the workpiece 20 in the radial direction at a constant speed, so as to form a spiral as shown in FIG. 9. The rotational speed of the rotary cutting tool 1 may be gradually reduced from 5,100 rpm to 1,360 rpm as the rotary cutting tool 1 is shifted in the radial direction. Consequently, the intervals between the dimples 22 are made to be substantially equal. As an alternative to the above-described method, the rotary cutting tool 1 is shifted in the radial direction from the vicinity of the outer peripheral surface 20a to the inner peripheral surface 20b while the rotational speed of the rotary cutting tool 1 is maintained to be constant. At the same time, the rotational speed of the workpiece 20, by virtue of rotation of the underlying table 82, can be gradually increased as the rotary cutting tool 1 approaches the inner peripheral surface 20b. This produces the same effect as the method described above, and the intervals between the plurality of the dimples 22 in the circumferential direction can be made to be substantially equal.

Figure 12:
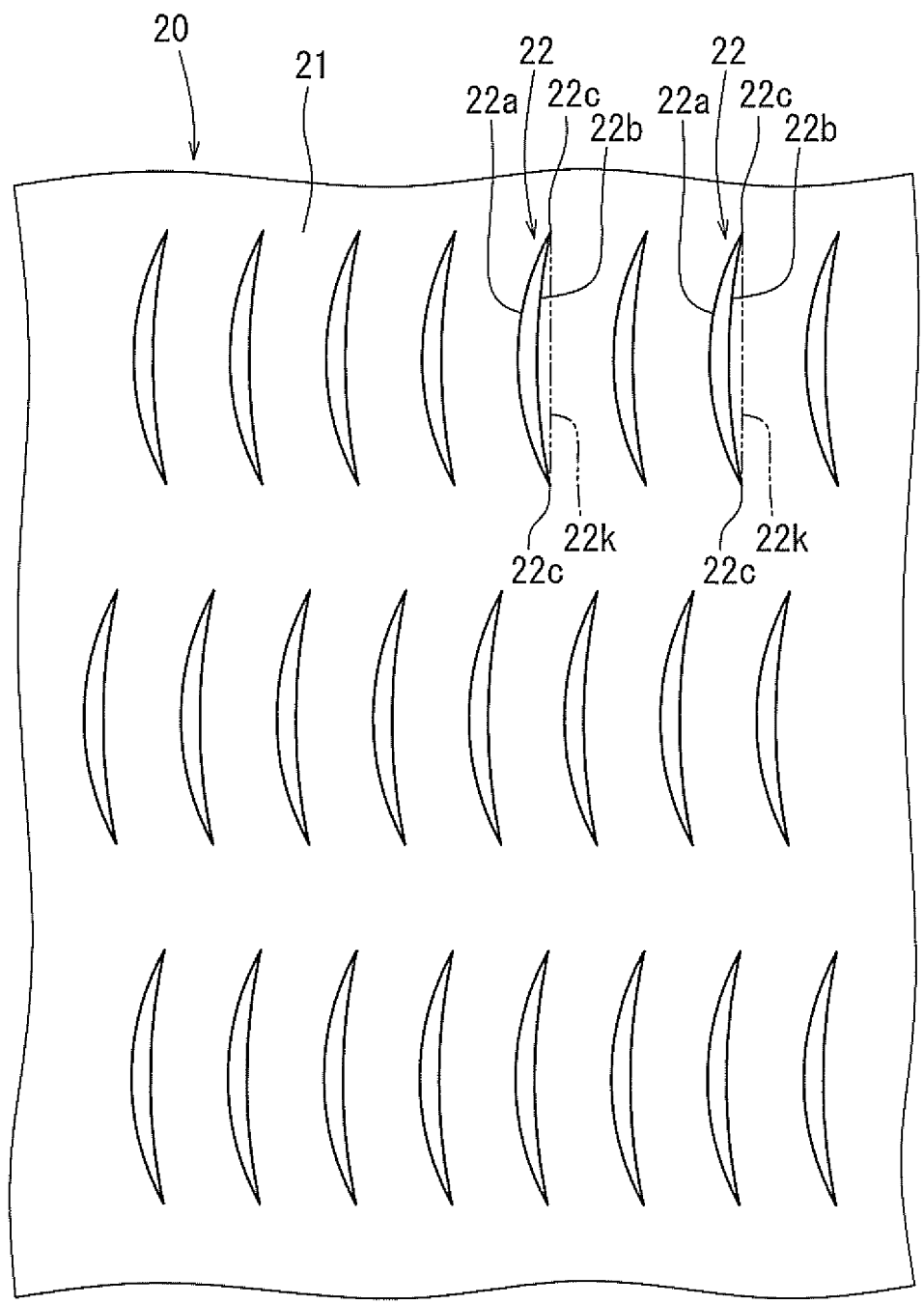
FIG. 12 is a partially enlarged top view of a workpiece processed with the processing apparatus of FIG. 10.

As illustrated in FIG. 12, the small dimples 22 may be formed in order in the width direction (in a lateral direction in FIG. 12). In this way, the plurality of spaced-apart dimples 22 may be arranged in parallel in the width direction on the processing surface 21 of the workpiece 20. The dimples 22 may be formed so as to be arranged on the processing surface 21 in a spiral manner as described above, and may be arranged at substantially constant intervals in not only the circumferential direction, but the radial direction as well (vertical direction in FIG. 12). The numbers and the positions of the dimples 22 are determined such that, for example, they occupy 10 to 30% of the area of the processing surface 21, with a preferable amount of about 20%.

The processing surface 21 formed with the dimples 22 is opposed to the counter piece 30 when the workpiece is used as a product as illustrated in FIGS. 7 and 8. The processing surface 21 is rotated, for example, about the axis 20c (see FIG. 9) of the workpiece 20 relative to the counter piece 30. Since the dimples 22 are non-circular, they have directivity such that the plurality of the dimples 22 are oriented in the same direction with respect to the movement of the counter piece 30 relatively to the dimples 22.

For example, as illustrated in FIG. 7, the counter piece 30 is shifted from the first side 22a to the second side 22b with respect to the dimples 22. The plurality of the dimples 22 are all oriented in the same direction with respect to the counter piece 30 that is relatively rotatable to the dimples 22. Therefore, the plurality of the dimples 22 exhibit the same effect with respect to their movement relative to counter piece 30. Alternative to the configuration of FIG. 7, as illustrated in FIG. 8 the counter piece 30 may shift from the second side 22b to the first side 22a with respect to the dimples 22, meaning that the workpiece 20 rotates in the opposite direction relative to the counter piece 30. In this case, as with the previous case, the plurality of the dimples 22 are all oriented in the same direction with respect to the counter piece 30 that is relatively rotating to the dimples 22. Therefore, the plurality of the dimples 22 exhibit the same effect with respect to the counter piece 30.

As illustrated in FIG. 6, the dimples 22 are formed on the workpiece 20. The dimples 22 serve to reduce frictional resistance generated between the workpiece 20 and the counter piece 30 that contacts the workpiece 20. For example, as illustrated in FIGS. 7 and 8, the frictional resistance may be increased when the abrasion powders are generated as the workpiece 20 contacts the counter piece 30 and are caught between the workpiece 20 and the counter piece 30. However, the abrasion powders may gather in the dimples 22 to reduce the frictional resistance due to the abrasion powders.

Alternatively, as illustrated in FIG. 6, oil may be poured between the workpiece 20 and the counter piece 30 to be filled in the dimples 22. As shown, the dimples 22 can hold the oil therein, such that it is possible to prevent the workpiece 20 and the counter piece 30 from coming in contact via the oil, and to prevent the workpiece 20 and the counter piece 30 from being adhered via abrasion powders. In particular, when the counter piece 30 passes near the dimples 22, the oil may be discharged from the interior of the dimples 22 between the counter piece 30 and the workpiece 20 at a high pressure, due to a squeezing effect formed by the rotation of counter piece 30 relative to workpiece 20, to form the lubrication film therebetween (squeezing effect). This pressure, and the resulting lubrication film formed, reduces or prevents the counter piece 30 from contacting the workpiece 20, such that the frictional resistance between the counter piece 30 and the workpiece 20 is reduced.

As described-above, the present exemplary embodiments relate to a method for processing dimples for forming the dimples 22 on the workpiece 20 utilizing the rotary cutting tool 1. A rotary cutting tool 1 has its cutting edge 3 projecting along the direction of its longitudinal axis, from a leading end of a rod-shaped main body 2 and from a location radially offset from the longitudinal axis 5 of the main body 2. The rotary cutting tool 1 is set such that the longitudinal axis 5 of the rotary cutting tool 1 is inclined with respect to a line perpendicular to the flat processing surface 21 of the workpiece 20. The rotary cutting tool 1 and the workpiece 20 are oriented in such a way that the rotary cutting tool 1 moves along the processing surface 21 while the rotary cutting tool 1 rotates about the axis 5. In this manner, spaced-apart dimples 22 are formed on the processing surface 21 by cutting the processing surface 21 with the cutting edge 3.

As described, the rotary cutting tool 1 is formed in a rod-shape and has the axially projecting cutting edge 3 at the leading end. Consequently, it is possible to rotate the cutting edge 3 at a small diameter compared to a radially extending cutting edge. As a result, the small dimples 22 can be formed with the cutting edge 3. The cutting edge 3 projects from a location radially offset from the longitudinal axis 5 of the leading end of the main body 2. Therefore, the cutting edge 3 may alternately cut the processing surface 21 and move away from the processing surface 21 when rotating the rotary cutting tool 1 in an inclined manner relative to the processing surface 21. In this alternative manner, the plurality of the relatively spaced apart dimples 22 can be easily formed.

As seen in FIG. 1, the cutting edge 3 penetrates the workpiece 20 in a diagonal orientation with respect to the processing surface 21 and gradually cuts into the processing surface 21. Subsequently, the cutting edge 3 gradually cuts out of the processing surface 21 and moves diagonally away from the workpiece 20. Therefore, as seen in FIG. 5, the dimples 22 are made to be shallow at both ends 22c and deeper than both the ends in the approximate center of the dimple 22 in the length direction. In contrast, the dimples formed by irradiating laser beam on the processing surface or dimples formed by shot peening have a sharp angle such as a substantially perpendicular angle with respect to the processing surface. As comparing to those dimples, the dimples 22 do not have such a sharp angle with respect to the processing surface 21. As a result, the dimples 22 do not have sharp angle variation with respect to the processing surface 21, wherein the squeezing effect can be easily exerted due to the pressure of grease.

Referring to FIG. 1, the cutting edge 3 starts cutting from a cutting start point (for example, one of the both ends 22c in FIG. 5) in accordance with a rotation of the rotary cutting tool 1 with respect to the processing surface 21 (in the circumferential direction in the plane shown in FIG. 5) and moves away from the processing surface 21 at a cutting terminal point (for example, the other one of the both ends 22c). Each of the dimples 22 includes the first side 22a and the second side 22b facing each other in the direction perpendicular to line 22k connecting the cutting start point and the cutting terminal point. The first side 22a curves so as to bulge in one direction with respect to the connecting line 22k. The second side 22b extends along the connecting line 22k or curves so as to bulge in the same direction.

As illustrated in FIG. 5, because the dimples 22 are non-circular, the dimples 22 have a shape having directivity, for example, formed in a crescent shape. Thus, as illustrated in FIG. 6, the movement direction of the counter piece 30 with respect to the dimples 22 can be determined relative to the orientation of the dimples 22. As a result, by determining said relative movement, the frictional resistance that is generated between the workpiece 20 and the counter piece 30, when the workpiece 20 and the counter piece 30 are move relative to each other can be reduced. Further, the dimples 22 having directivity can be formed by rotating the rotary cutting tool 1 at an incline with respect to the processing surface 21 while the cutting edge 3 projects further in the leading direction from the position displaced from the longitudinal axis 5 of the leading end of the main body 2. As a result, the dimples 22 having directivity can be easily and reliably formed.

Referring to FIG. 1, the rotary cutting tool 1 is set such that the longitudinal axis 5 of the rotary cutting tool 1 has an inclination angle counterclockwise from the lined oriented perpendicular to the processing surface 21 of less than or equal to 60 degrees with respect to a line perpendicular to the processing surface 21 of the workpiece 20. Therefore, because of this inclination angle, the rotary cutting tool 1 comes into contact with the processing surface 21 at a more vertical angle with respect to the processing surface 21 compared to the case where, for example, the axis 5 is oriented parallel to the processing surface 21. Therefore, the bending stress applied to the rotary cutting tool 1 is reduced. As a result, the diameter of the rotary cutting tool 1 can be made relatively small, which also enables the small rotary cutting tool 1 to form smaller-sized dimples 22. Furthermore, because the longitudinal axis 5 of the rotary cutting tool 1 is inclined relative to the vertical line oriented perpendicular to the processing surface 21 of the workpiece 20, this allows the cutting edge 3 to move away from the processing surface 21 so that the plurality of the relatively spaced dimples 22 can be formed.

As illustrated in FIG. 5, the dimple 22 has a length 22e measured along a cutting direction of the rotary cutting tool 1, a maximum width 22f that is the maximum value of the width of the dimple 22 measured perpendicular to the cutting direction. The maximum width 22f is less than the length 22e, and a maximum depth is less than or equal to 10% of the length 22e. Consequently, the elongated dimples 22 may be formed by the rotary cutting tool 1. Further, the length 22e of the dimple 22 depends on the cutting direction of the rotary cutting tool 1, i.e., the circumferential length of the main body 2 of the rotary cutting tool 1. As a result, the dimples 22 having a narrow width may be formed by the rotary cutting tool 1.

As illustrated in FIG. 5, each of the dimples 22 includes two sides 22a and 22b that are opposed to each other in a direction orthogonal to the cutting direction of the rotary cutting tool 1. However, the two sides 22a and 22b are curved in the same direction relative to the line 22k connecting both ends 22c of the dimple 22. Therefore, the dimples 22 have directivity so that it is possible to provide a favorable characteristic to the processing surface 21 utilizing the directivity.

As illustrated in FIG. 5, the dimple 22 has a length 22e measured along the cutting direction of the rotary cutting tool 1, as well as a width measured perpendicular to the cutting direction, and a depth groove bottom line 22d connecting the deepest points at each width cross-section spanning the length of the dimple 22. The groove bottom line 22d is offset from the center of the width. The groove bottom line 22d may be disposed in a predetermined position calculated taking into account the effect of collecting the abrasion powders and the squeezing effect described above. As a result, the friction coefficient generated between the workpiece 20 and the counter piece 30 can be effectively reduced by optimal placement of the groove bottom line 22d.

For example, as illustrated in FIG. 6, the angles of the inclined surfaces 22g and 22h of the dimples 22 are determined in accordance with the position of the groove bottom line 22d, which as explained above is offset from the center of the width direction. For example, one of the angles of the inclined surfaces 22g and 22h may be increased while the other one of the angles is reduced, when the groove bottom line 22d approaches one of the two sides 22a and 22b of the dimple 22, and vice versa if it approaches the other of the two sides. Therefore, when the position of the groove bottom line 22d is offset substantially from the center of the width, the dimples 22 can be structurally configured to have a greater squeezing. This configuration can reduce the frictional resistance between the workpiece 20 and the counter piece 30.

As illustrated in FIG. 2, the rotary cutting tool 1 includes a first end cutting edge 3a positioned on the radially outer side of the cutting edge 3a and the second end cutting edge 3b positioned on the radially inner side of the cutting edge 3a. The dimple 22 has a first side 22a (see FIG. 5) correspondingly formed by the first end cutting edge 3a, and its second side 22b is formed by the second end cutting edge 3b, respectively. The first side 22a and the second side 22b move in the circumferential direction on the plane of the processing surface 21 in the same direction. As a result, the dimple 22 is formed in a crescent shape.

As illustrated in FIG. 6, the dimple 22 can reduce the frictional resistance formed between the counter piece 30 and the workpiece 20. The frictional resistance may be affected by number of the dimples 22, area ratio of the dimples 22 with respect to the overall surface area of the processing surface 21, and distributed condition of the dimples 22, etc. The dimples 22 are relatively small. Therefore, the area ratio of the dimples 22 to the processing surface 21 can be easily adjusted. The dimples 22 may be easily and evenly distributed on the processing surface 21.

As illustrated in FIG. 5, the dimple 22 has a straight line depicting the longest length, i.e. the line 22k connecting both ends 22c of the dimple 22. The dimple 22 has a shape in that the majority, for example, more than half, of the outer periphery of the dimple 22 is located in a region on the same side with respect to the straight line 22k depicting the longest length. Therefore, the dimples 22 have directivity and therefore this directivity may have a predetermined effect in the interaction of the workpiece 20 with the counter piece 30 illustrated in FIG. 6.

As illustrated in FIG. 9, the rotary cutting tool 1 is inclined with respect to the processing surface 21 and its inclination direction is opposite to the relative feed direction of the rotary cutting tool 1 to the workpiece 20 (feed direction is clock-wise whereas the cutting tool 1 is inclined counter-clockwise to the line oriented perpendicular to the processing surface 21). Therefore, as illustrated in FIG. 12, the longitudinal direction of the dimple 22 is substantially perpendicular to the relative feed direction. The plurality of the dimples 22 are arranged in parallel in the relative feed direction.

Figure 13:
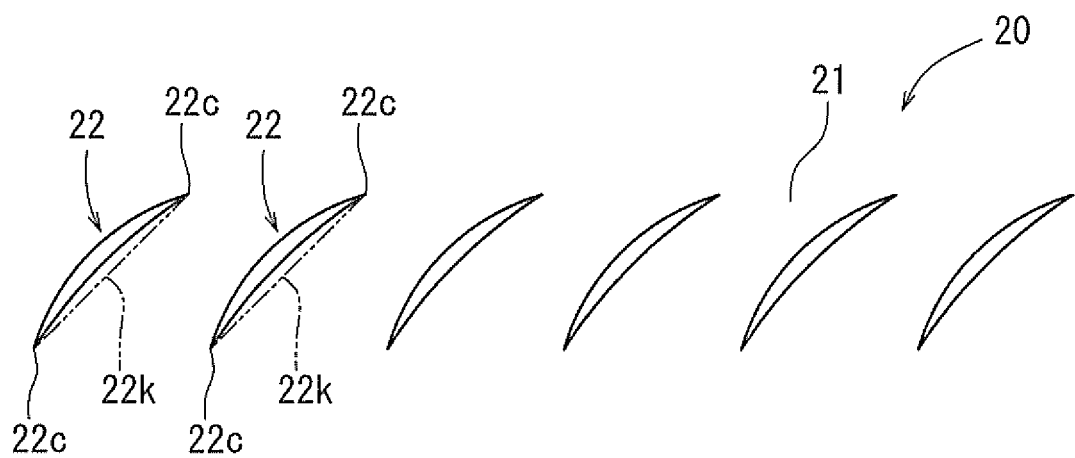
FIG. 13 is a partially enlarged top view of a workpiece having dimples arranged in an alternative pattern.
Figure 14:
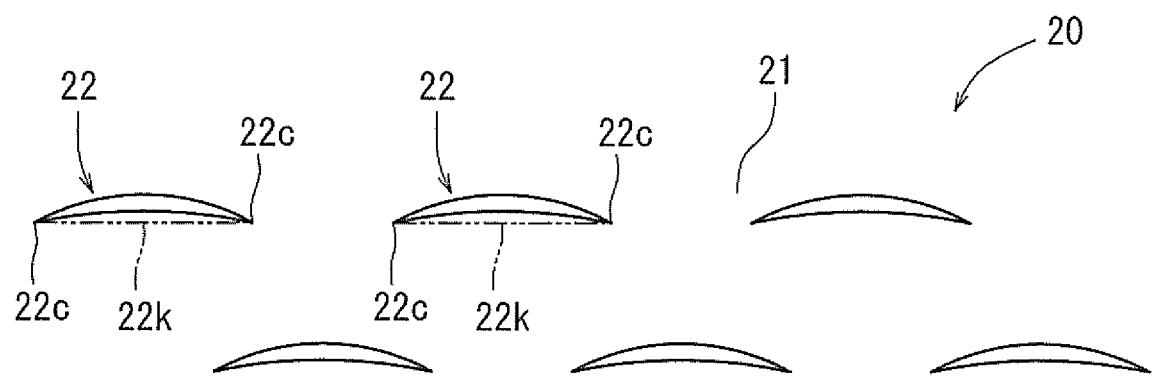
FIG. 14 is a partially enlarged top view of a workpiece having dimples arranged in an alternative pattern.

Alternative to the pattern illustrated in FIG. 12, the plurality of the dimples 22 may be arranged in patterns illustrated in FIGS. 13 and 14. For example, in the pattern of FIG. 13, the rotary cutting tool 1 is set to be oriented diagonally with respect to the relative feed direction of the processing surface 21 of the rotary cutting tool 1. More specifically, a line projecting the longitudinal axis 5 of the rotary cutting tool 1 on the processing surface 21 has an angle with respect to a line in parallel to the relative feed direction of the rotary cutting tool 1 with respect to the processing surface 21. For example, with such a projecting line, in FIGS. 9 and 10, the rotary cutting tool 1 in such an embodiment (pattern of FIG. 13) is inclined relative to the processing surface 21 in the X-direction and the Y-direction.

In the pattern of FIG. 14, longitudinal direction of the dimples 22 corresponds to relative feed direction of the rotary cutting tool 1 with respect to the processing surface 21. Specifically, a line that is made by projecting the axis 5 of the rotary cutting tool 1 on the processing surface 21 extends perpendicular to the line that is parallel to the relative feed direction of the rotary cutting tool 1 with respect to the processing surface 21. For example, the rotary cutting tool 1 is installed to the right and left of the dimple 22 regions of the processing surface 21 illustrated in FIG. 9, and may be inclined only in the X-direction (X-Z plane) referring to FIG. 10. Alternatively, the rotary cutting tool 1 may be installed upward and downward of the dimple regions of the processing surface 21 illustrated in FIG. 9, and inclined only in the Y-direction (Y-Z plane) referring to FIG. 10. In this way, the longitudinal direction of the dimple 22 is brought to be substantially parallel to the feed direction of the rotary cutting tool 1 with respect to the processing surface 21. The plurality of the dimples 22 are successively formed in the longitudinal direction and arranged in parallel to the longitudinal direction. The rotary cutting tool 1 is shifted with respect to the processing surface 21 in the radial direction as well referring to FIG. 9. Therefore, the plurality of the dimples 22 are arranged in parallel in the radial direction (up and down direction) as illustrated in FIG. 14.

Figure 15:
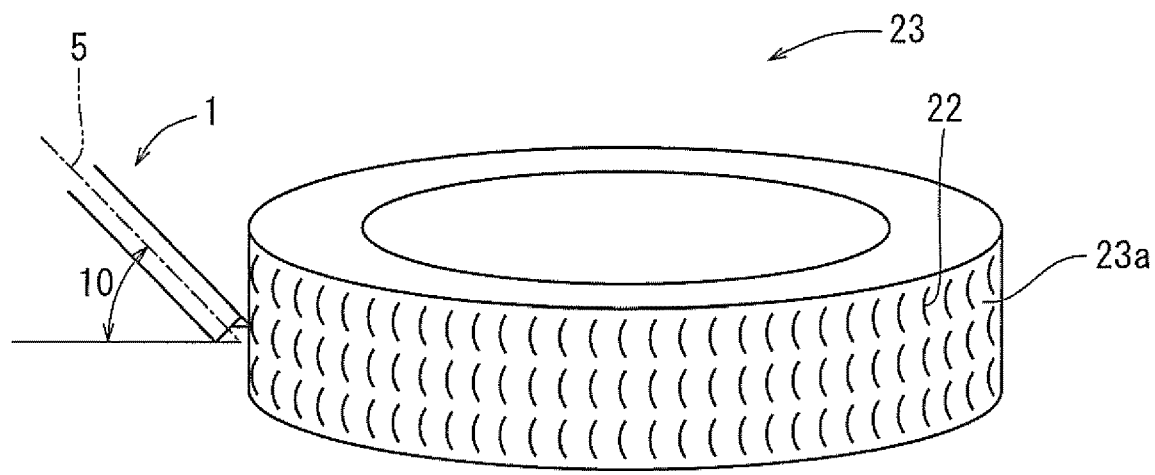
FIG. 15 is a perspective view of a workpiece having another shape.

As an alternative to the workpiece 20 illustrated in FIG. 9, a plurality of dimples 22 may be formed on a workpiece 23 as illustrated in FIG. 15. Instead of an upper surface, the workpiece 23 has a radially outer peripheral surface configured as a processing surface 23a. The rotary cutting tool 1 is set to have an angle 10 with respect to the radial direction line that is perpendicular to the processing surface 23a. The workpiece 23 is rotated about the vertical axis at the radial center thereof while the rotary cutting tool 1 is rotated about its longitudinal axis 5 at its respective radial center. The rotary cutting tool 1 is moved in a curved manner in the vertical axial direction with respect to the workpiece 23.

In this way, the plurality of the dimples 22 can be arranged on the processing surface 23a of the work piece 23 illustrated in FIG. 15 so as to be parallel in the circumferential direction as well as in the axial direction. Specifically, the plurality of the dimples 22 are arranged in the processing surface 23a in a spiral manner.

Each of the first angles 3d and the second angles 3e as illustrated in FIG. 2 can be set at a predetermined angle. For example, the dimple 22 illustrated in FIG. 5 may be formed when the first angle 3d and the second angle 3e are set at 15 degrees respectively. A dimple 24 illustrated in FIG. 16 may be formed when the first angle 3d and the second angle 3e are set at 20 degrees respectively.

Figure 16:
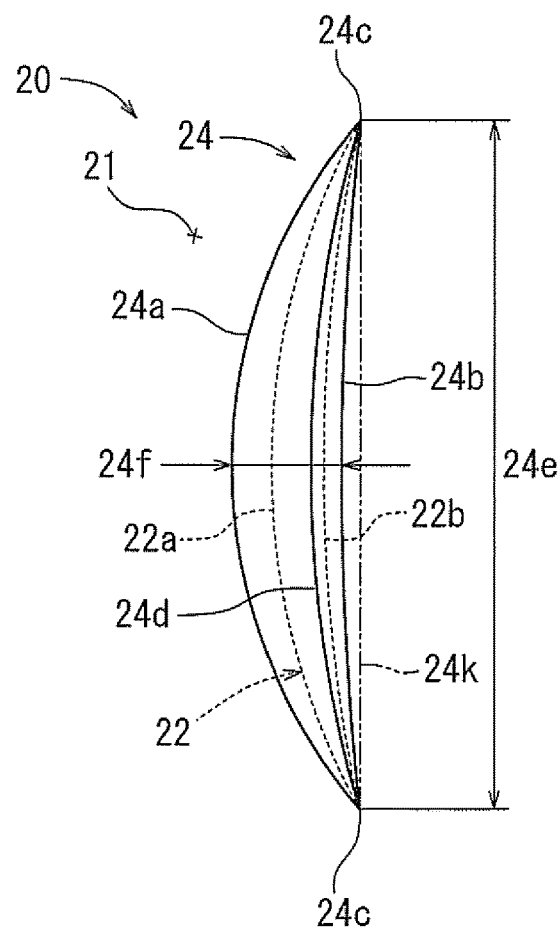
FIG. 16 is an enlarged top view of a dimple according to another exemplary embodiment.

As illustrated in FIG. 16, the dimple 24 has a first side 24a, a second side 24b, and two opposing vertical ends 24c. The first side 24a is a curved line and has greater curvature than the first side 22a indicated by a dotted line. The second side 24b is a curved line having a smaller curvature than the second side 22b indicated by the dotted line and is proximal to a line 24k connecting the both ends 24c in a vertical, longest configuration. Therefore, each of the dimples 24 has a width 24f, which is greater than the width of the dimple 22 as indicated by the dotted line. The length 24e of the dimple 24 substantially coincides with the length of the dimple 22 indicated by the dotted line. A groove bottom line 24d, which serves to connect the deepest points at each width cross-section spanning the length of the dimple 24, is positioned in a location near to the second side 24b.

Figure 17:
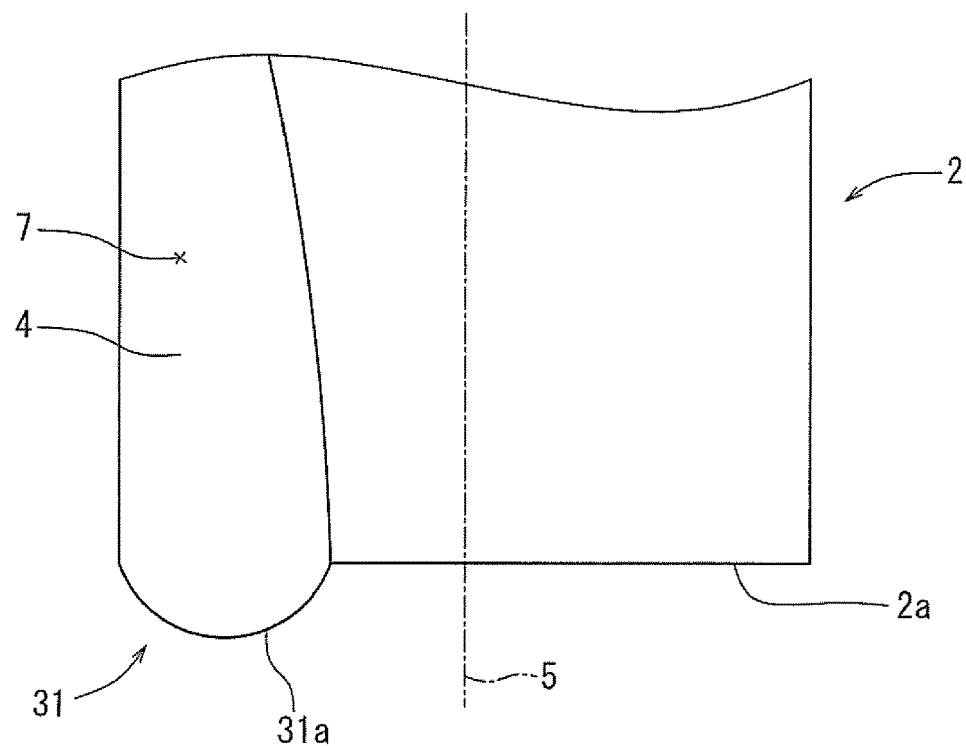
FIG. 17 is an enlarged front view of a leading end of an embodiment of a rotary cutting tool.
Figure 18:
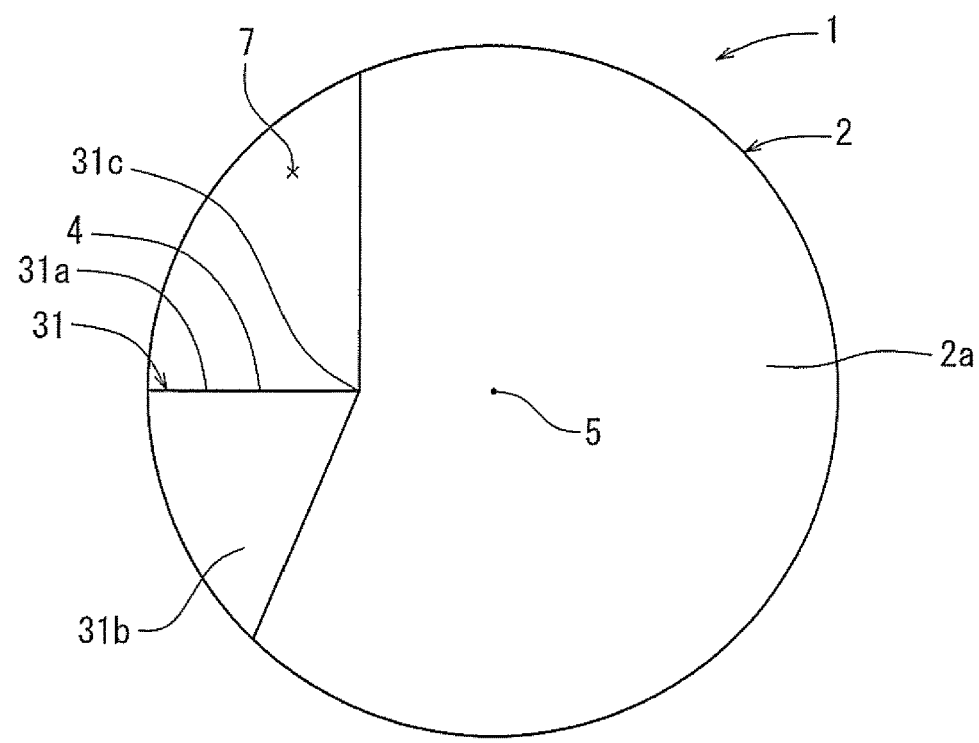
FIG. 18 is an enlarged bottom view of the leading end of the rotary cutting tool of FIG. 17.

The rotary cutting tool 1 may have a cutting edge 31 illustrated in FIG. 17 as an alternative to the cutting edge 3 illustrated in FIG. 2. The cutting edge 31 is positioned at a location offset from the longitudinal axis 5 of the main body 2, and projects further in a leading direction from the leading end 2a of the main body 2 in the longitudinal axial direction. The cutting edge 31 projects axially in the longitudinal leading direction from a leading end of a groove 7 formed in the main body 2. The cutting edge 31 has an end cutting edge 31a having a substantially circular-arc shape 3 spanning an approximate semi-circle. The cutting edge 31 has a rake face 4 on a plane continuous with the bottom of the groove 7. The cutting edge 31 has a flank 31b on the opposite side to the rake face 4 as illustrated in FIG. 18. The flank 31b extends diagonally from the end cutting edge 31a toward the leading end 2a of the main body 2 along the circumference of the plane of the interior circular cross-section of tool 1 orthogonal to the longitudinal axis 5 at its leading end 2a.

Figure 19:
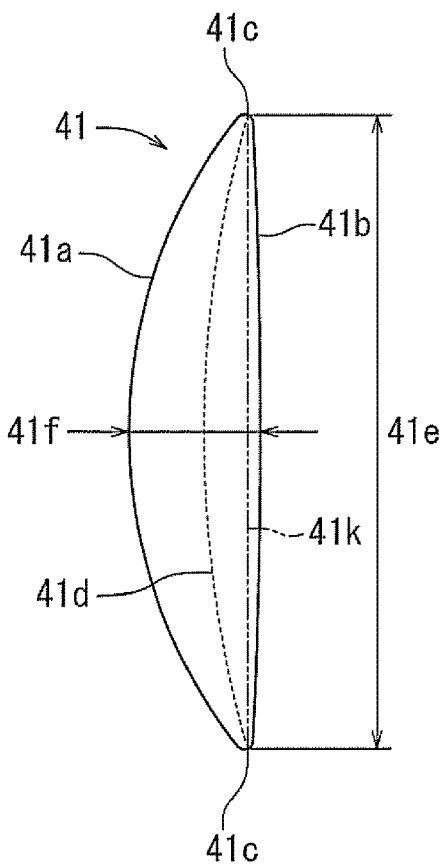
FIG. 19 is an enlarged top view of a dimple formed utilizing the rotary cutting tool of FIG. 17.

The cutting edge 31 illustrated in FIGS. 17 and 18 forms a dimple 41 illustrated, for example, in FIG. 19. The dimple 41 has a first side 41a, a second side 41b opposing the first side 41a, and two vertically opposing ends 41c. The first side 41a and the second side 41b are curved lines. The first side 41a and the second side 41b bulge in different directions so as to be spaced apart from each other with respect to the vertical line connecting the two ends 41c.

The dimple 41 has the first side 41a bulged to one side in the width direction and the second side 41b bulged to the other side in the width direction as illustrated in FIG. 19, with respect to the vertical longest line connecting the two ends 41c. In particular, the first side 41a is located on one side, in one region across the vertical longest line 41k connecting the ends 41c, whereas the entire or most of the part of the second side 41b is located on the other side, or in the other region across the line 41k. Both of the ends 22c of the dimple 22 illustrated in FIG. 5 connect the first side 22a and the second side 22b at an acute angle. On the other hand, both of the vertical ends 41c of the dimple 41 illustrated in FIG. 19 connect the first side 41a and the second side 41b in a curved manner to correspond to the shape of the end cutting edge 31a.

Figure 20:
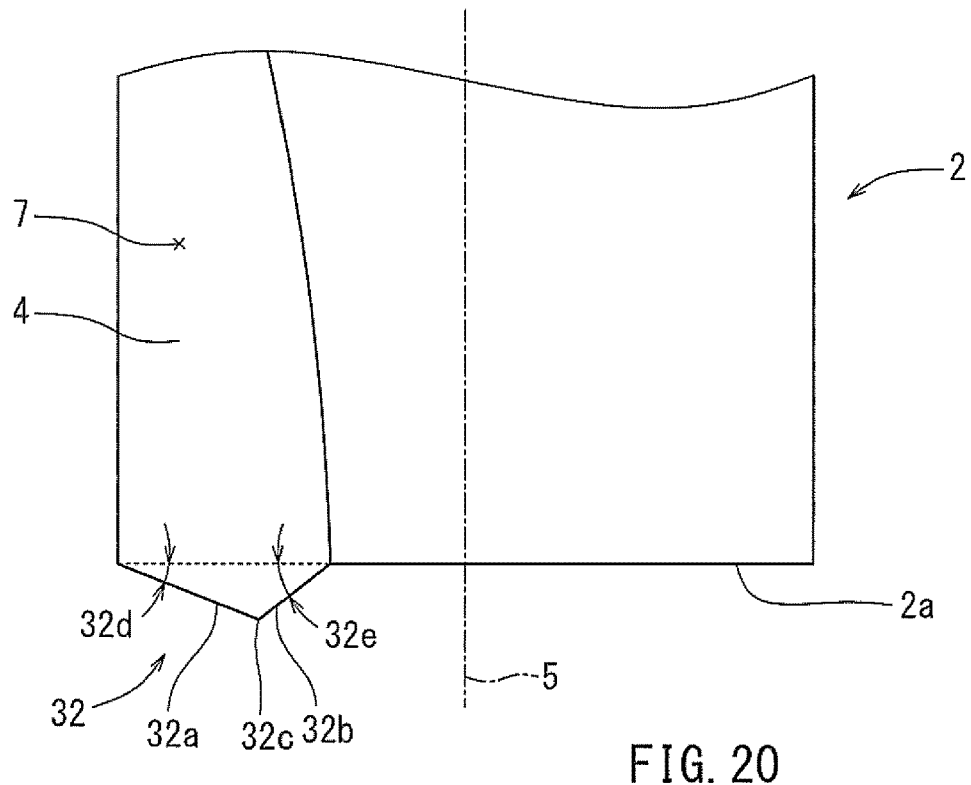
FIG. 20 is an enlarged front view of a leading end of an embodiment of a rotary cutting tool.

The rotary cutting tool 1 may have a cutting edge 32 as illustrated in FIG. 20 as an alternative to the cutting edge 3 illustrated in FIG. 2. The cutting edge 32 is located in a position offset widthwise from the longitudinal axis 5 of a main body 2 and axially projects from a leading end 2a of the main body 2, further in the leading direction, parallel to the longitudinal axis 5. The cutting edge 32 axially projects from a leading end of a groove 7 formed in the main body 2. The cutting edge 32 has a substantially triangular shape and includes a first end cutting edge 32a positioned on the radially outer side and a second end cutting edge 32b positioned on the radially inner side.

As illustrated in FIG. 20, the first end cutting edge 32a extends straight from the vicinity of the outer peripheral edge of the main body 2 downward and radially inward toward the axis 5. The first end cutting edge 32a has a first angle 32d with respect to the plane of the interior circular cross section of tool 1 perpendicular to the longitudinal axis 5 at its leading end 2a. The second end cutting edge 32b extends straight from substantially radially offset point radially outward from the radial center of the leading end 2a of the main body 2, and extends radially outward and downward toward the outer peripheral edge of the main body 2, where it intersects with the first end cutting edge 32a. As a result, the second end cutting edge 32b has a second angle 32e with respect to the interior circular cross-sectional plane described above oriented perpendicular to the axis 5. The second angle 32e is greater than the first angle 32d, for example, 1.5 to 3 times greater.

As illustrated in FIG. 20, the cutting edge 32 has a rake face 4 on a plane continuous with a bottom of a groove 7. The cutting edge 32 includes a flank on the opposite side of the rake face 4. The flank diagonally extends from the first end cutting edge 32a and the second end cutting edge 32b toward a leading end 2a of the main body 2 similar to the flanks 8a and 8b illustrated in FIG. 3. The cutting edge 32 forms a dimple 42 illustrated, for example, in FIG. 21.

Figure 21:
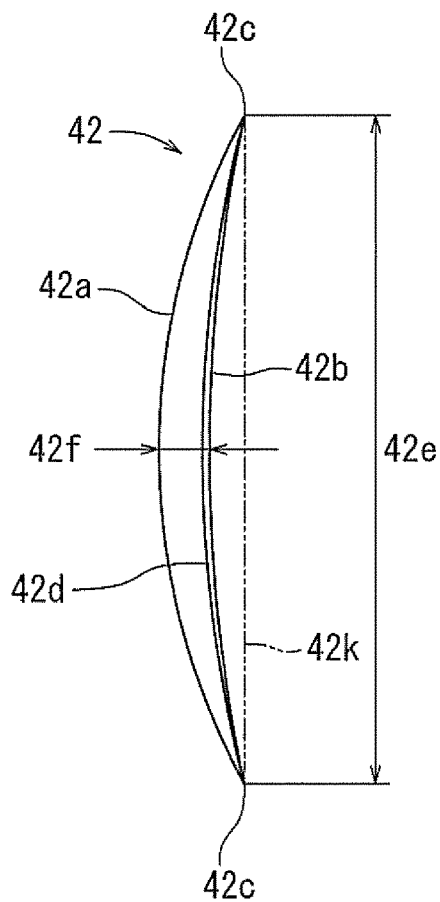
FIG. 21 is an enlarged top view of a dimple formed utilizing the rotary cutting tool of FIG. 20.

As illustrated in FIG. 21, the dimple 42 has a first side 42a, a second side 42b opposed widthwise to the first side 42a, and two opposing vertical ends 42c. The first side 42a and the second side 42b are curved lines. Both the first side 42a and the second side 42b bulge towards the same one side in the width direction with respect to the vertical longest line 42k connecting both ends 42c. The entirety, or at least a majority of, the first side 42a and the second side 42b is located in one region, on one side, with respect to the line 42k connecting ends 42c. Both the ends 42c connect the first side 42a and the second side 42b at an acute angle.

Figure 22:
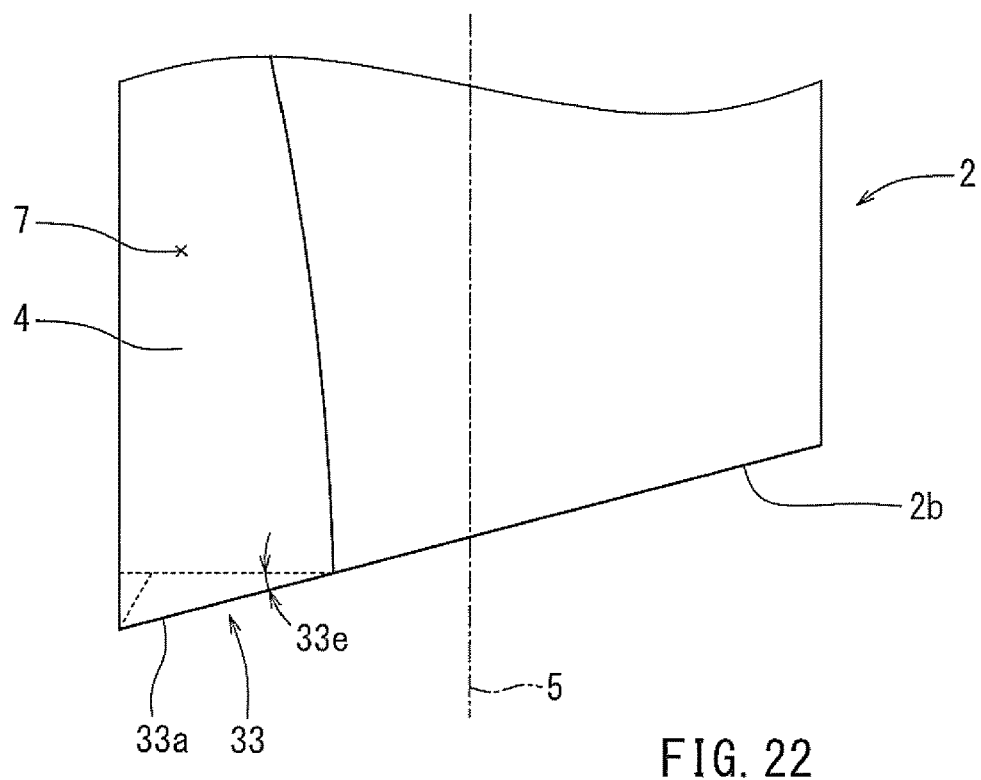
FIG. 22 is an enlarged front view of a leading end of an embodiment of a rotary cutting tool.

The rotary cutting tool 1 may have a cutting edge 33 as illustrated in FIG. 22 as an alternative to the cutting edge 3 illustrated in FIG. 2. A main body 2 of the rotary cutting tool 1 may have a leading end 2b illustrated in FIG. 22 as an alternative to the leading end 2a illustrated in FIG. 2. A leading end 2b of the main body 2, in contrast to the leading end 2a, is inclined relative to the plane oriented perpendicular to the axis 5. The cutting edge 33 is positioned at an axial distal end of the leading end 2b. The cutting edge 33 is positioned at a location offset widthwise from the longitudinal axis 5 of the main body 2, and includes an end cutting edge 33a inclined with respect to the plane oriented perpendicular to the axis 5 at the same angle 33e as that of the leading end 2b of the main body 2.

As illustrated in FIG. 22, the end cutting edge 33a extends straight from the substantially radial center of the leading end 2b of the main body 2, offset radially outward from the radial center, downward and radially outward toward the outer peripheral edge. A radially outward leading end of the end cutting edge 33a projects furthest in the axial direction of the entire leading end 2b. The cutting edge 33 has a rake face 4 on a plane continuous with a bottom of the groove 7. The cutting edge 33 has a flank on the opposite side to the rake face 4. The cutting edge 33 forms, for example, a dimple 43 illustrated in FIG. 23.

Figure 23:
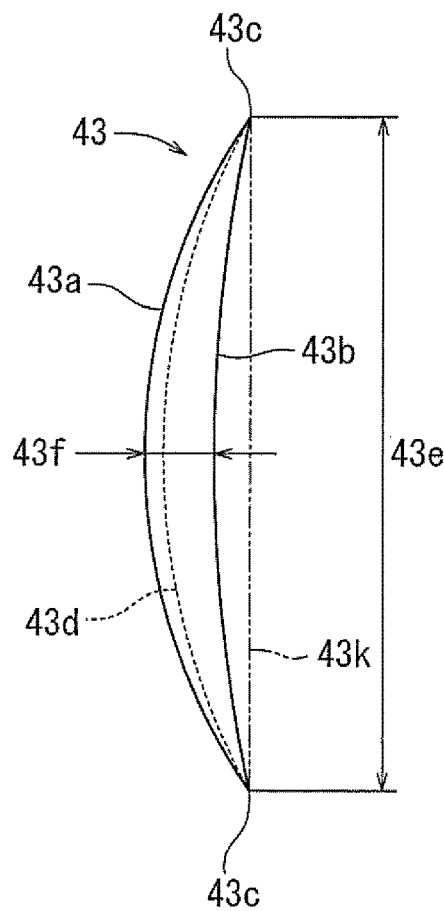
FIG. 23 is an enlarged top view of a dimple formed utilizing the rotary cutting tool of FIG. 22.

As illustrated in FIG. 23, the dimple 43 includes a first side 43a, a second side 43b widthwise opposed to the first side 43a, and two opposing vertical ends 43c. The first side 43a and the second side 43b are opposed in the width direction. The first side 43a is a curved line and bulges toward one side in the width direction. The second side 43b is also a curved line and bulges toward the same one side in the width direction with respect to the line 43k connecting ends 43c in the vertical longest configuration.

Figure 24:
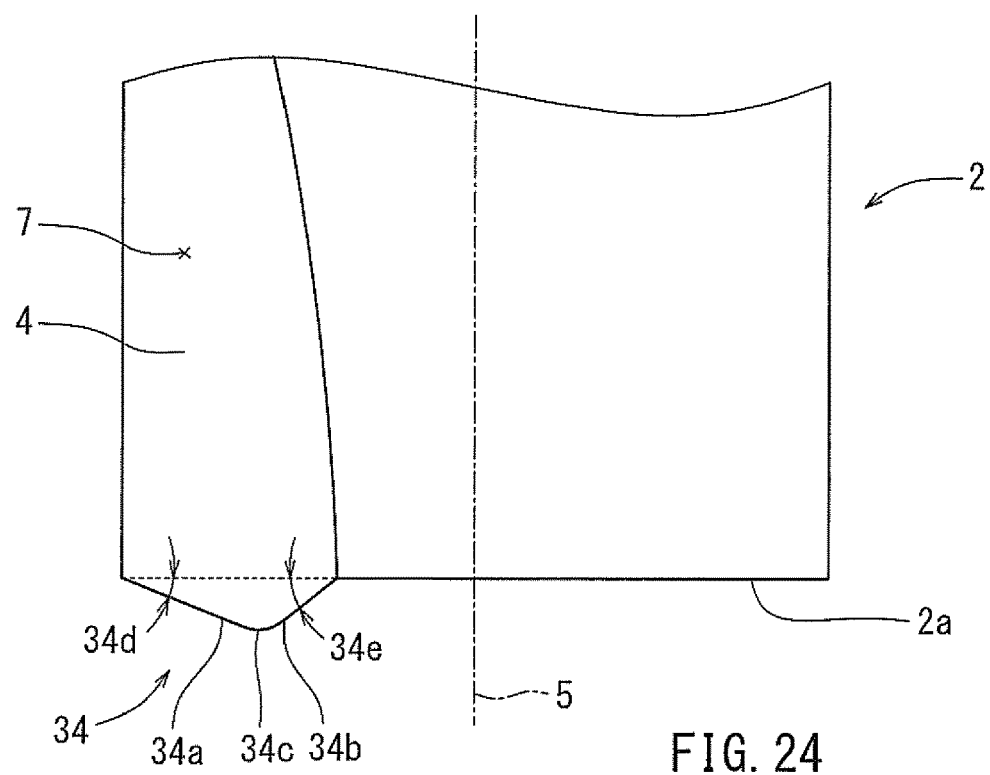
FIG. 24 is an enlarged front view of a leading end of an embodiment of a rotary cutting tool.

The rotary cutting tool 1 may have a cutting edge 34 illustrated in FIG. 24 alternative to the cutting edge 3 illustrated in FIG. 2. The cutting edge 34 is located at a position offset from an axis 5 of a main body 2 and projects further in the leading direction parallel to the longitudinal axis 5 from a leading end 2a of the main body 2. The cutting edge 34 projects in the axial direction from a leading end of a groove 7 formed in the main body 2. The cutting edge 34 has a substantially triangular shape; and includes a first end cutting edge 34a positioned on the radially outer side of the cutting edge 34, a second end cutting edge 34b positioned on the radially inner side of the cutting edge 34, and a third end cutting edge 34c connecting the first end cutting edge 34a and the second end cutting edge 34b in a smooth, curved manner.

As illustrated in FIG. 24, the first end cutting edge 34a extends straight from the vicinity of the outer peripheral edge of the main body 2 downward and radially inward toward the axis 5. The first end cutting edge 34*a* has a first angle 34*d* with respect to the plane of the interior circular cross-section of tool 1 oriented perpendicular to the longitudinal axis 5 at the leading end 2*a*. The second end cutting edge 34*b* extends straight from a substantially radial center of a leading end 2*a* of the main body 2, offset radially outward of the radial center, radially outward and downward toward the outer peripheral edge of the main body 2, where it intersects with the first end cutting edge 34*a*. The second end cutting edge 34*b* has a second angle 34*e* with respect to the same interior circular cross-sectional plane oriented perpendicular to the axis 5. The second angle 34*e* is greater than the first angle 34*d*, for example, 1.5 to 3 times greater than the first angle 34*d*.

As illustrated in FIG. 24, the end cutting edge 34 has a rake face 4 on a plane continuous with a bottom of a groove 4. The cutting edge 34 has a flank on the opposite side to the rake face 4. The flank diagonally extends from the first end cutting edge 34*a*, the second end cutting edge 34*b* and the third end cutting edge 34*c* toward the leading end 2*a* of the main body 2 similar to the flanks 8*a* and 8*b* illustrated in FIG. 3. The cutting edge 34 forms a dimple 44 illustrated, for example, in FIG. 25.

Figure 25:
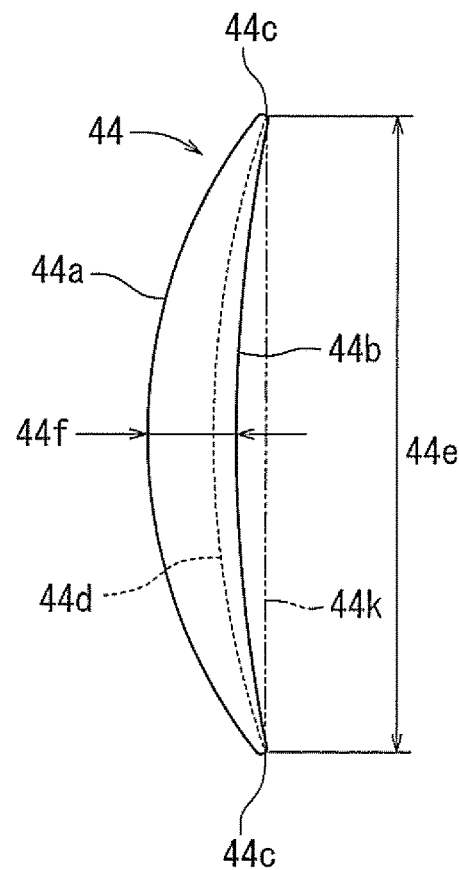
FIG. 25 is an enlarged top view of a dimple formed utilizing the rotary cutting tool of FIG. 24.

As illustrated in FIG. 25, the dimple 44 has a first side 44*a*, a second side 44*b* widthwise opposed to the first side 44*a*, and two vertically opposing ends 44*c*. The first side 44*a* and the second side 44*b* are curved lines. Both the first side 44*a* and the second side 44*b* bulge towards one side in the width direction relative to the vertical longest line connecting both vertical ends 44*c*. The entirety of, or at least the majority of, the first side 44*a* and the second side 44*b*, is located on one side of, and in one region, with respect to the vertical longest line 44*k* connecting ends 44*c*. Both of ends 44*c* are curved to smoothly connect the first side 44*a* and the second side 44*b*.

Figure 26:
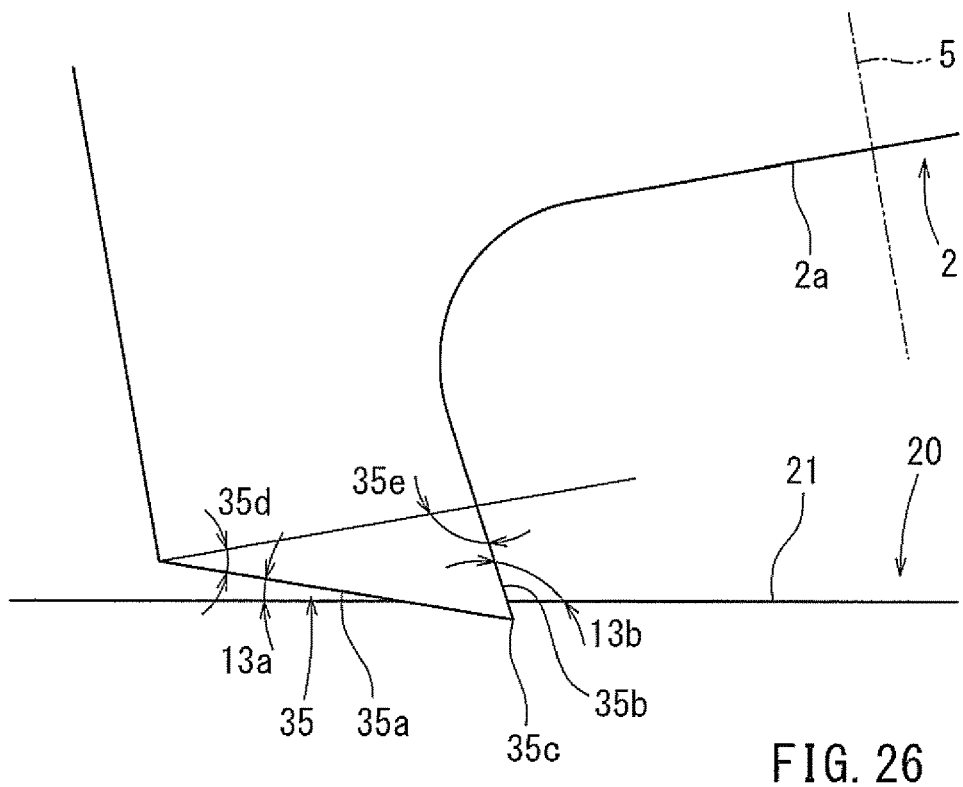
FIG. 26 is a partially enlarged front view of a leading end of an embodiment of a rotary cutting tool.

The rotary cutting tool 1 may have a cutting edge 35 illustrated in FIG. 26 as an alternative to the cutting edge 3 illustrated in FIG. 2. The cutting edge 35 is positioned at a location offset radially outward from the longitudinal axis 5 of the main body 2, and projects from a leading end 2*a* of the main body 2 further in the axial longitudinal direction. The cutting edge 35 has a substantially triangular shape, and includes a first end cutting edge 35*a* extending radially inward and downward from the outer peripheral edge of the main body 2, and a second end cutting edge 35*b* extending radially outward and upward from a substantially radial center of the main body 2.

As illustrated in FIG. 26, the first end cutting edge 35*a* extends straight from the vicinity of the outer peripheral edge of the main body 2 toward the longitudinal axis 5. The first end cutting edge 35*a* forms a first angle 35*d* with respect to the interior cross-section of tool 1 oriented perpendicular to the axis 5 at the leading end from where the edge 35*a* projects. The second end cutting edge 35*b* extends straight from a position at the substantially radial center of the main body 2 toward the axis 5. The second end cutting edge 35*b* forms a second angle 35*e* with respect to the plane oriented perpendicular to the axis 5. The second end cutting edge 35*b* extends toward the axis 5 similar to the first end cutting edge 35*a* and is aligned with the first end cutting edge 35*a* in the axial direction. The first end cutting edge 35*a* and the second end cutting edge 35*b* are connected with an end cutting edge peak 35*c* formed at an acute angle. The first end cutting edge 35*a* and the second end cutting edge 35*b* are both positioned on the radially outward relative to the end cutting edge peak 35*c*. The cutting edge 35 forms a dimple 45, for example, illustrated in FIG. 27.

Figure 27:
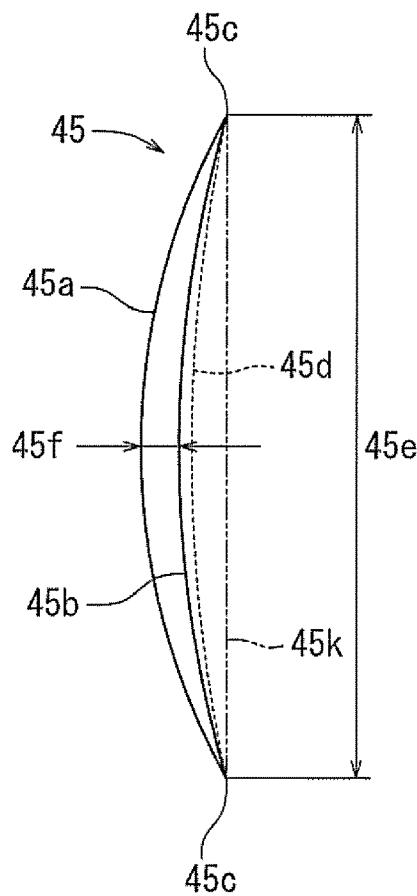
FIG. 27 is an enlarged top view of a dimple formed utilizing the rotary cutting tool of FIG. 26.

As illustrated in FIG. 27, the dimple 45 has a first side 45*a*, a second side 45*b* widthwise opposed to the first side 45*a*, and two vertically opposed ends 45*c*. The first side 45*a* and the second side 45*b* are curved lines. The first side 45*a* and the second side 45*b* both bulge toward one side in the width direction relative of the vertical longest line connecting both ends 45*c*. The entirety of, or at least the majority of, the first side 45*a* and the second side 45*b* is located on one side, in one region, with respect to the line 45*k* connecting ends 45*c*.

As illustrated in FIG. 27, the dimple 45 includes a groove bottom line 45*d* connecting deepest points at every width cross-section spanning the length of each dimple 45. The groove bottom line 45*d* is formed by the end cutting edge peak 35*c* illustrated in FIG. 26. The groove bottom line 45*d* is positioned in a location further beyond (radially outward of) the second side 45*b*, radially outward relative to a region between the first side 45*a* and the second side 45*b*. Therefore, with reference to FIG. 6, when the workpiece 20 and the counter piece 30 are slidably moved, abrasion powders are generated and the dimple 45 can reliably hold the abrasion powders within the dimple 45.

Figure 28:
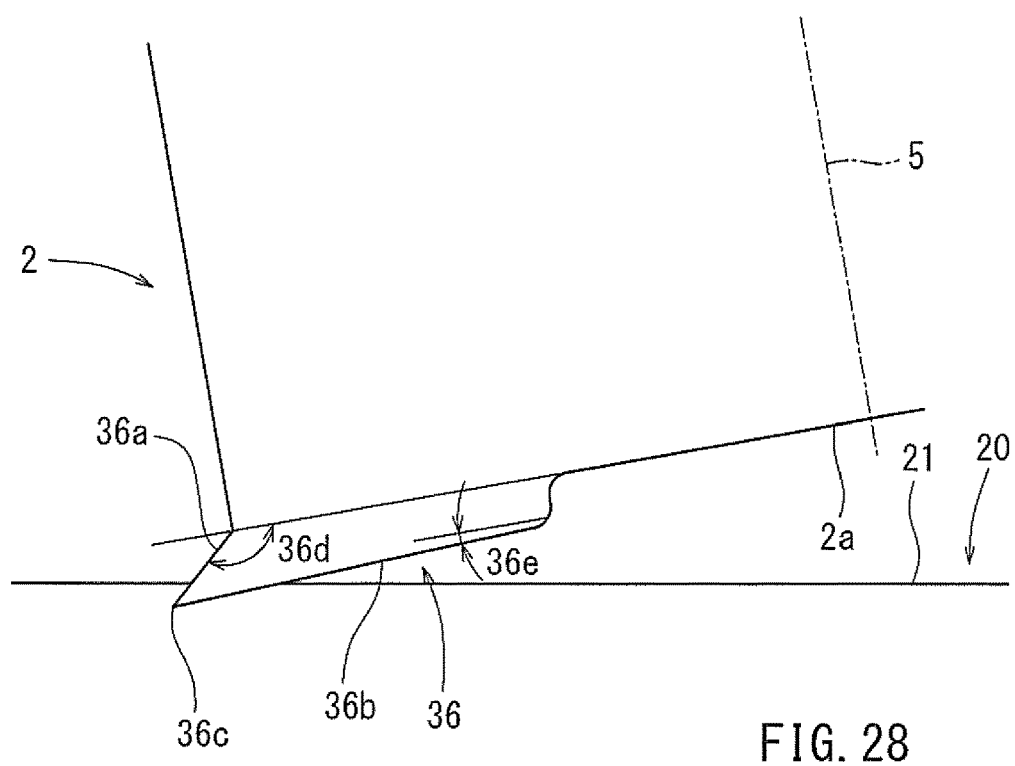
FIG. 28 is a partially enlarged front view of a leading end of an embodiment of a rotary cutting tool.

The rotary cutting tool 1 may include a cutting edge 36 illustrated in FIG. 28 as a further alternative to the cutting edge 3 illustrated in FIG. 2. The cutting edge 36 is positioned in a location radially offset from an axis 5 of the main body 2 and extends from a leading end 2*a* of the main body 2 in the longitudinal axial direction, further in the leading direction. The cutting edge 36 has a substantially triangular shape, and includes a first end cutting edge 36*a* extending from the outer peripheral edge of the main body 2 and a second end cutting edge 36*b* extending from a position of substantially the radial center of the main body 2.

As illustrated in FIG. 28, the first end cutting edge 36*a* extends straight from the vicinity of the outer peripheral edge of the main body 2 in a direction radially outward, and away from, the axis 5. The first end cutting edge 36*a* has a first angle 36*d* with respect to the plane of the interior cross-section of tool 1 oriented perpendicular to the longitudinal axis 5 at its leading end 2*a*. The second end cutting edge 36*b* extends straight from the substantially radial center of the main body 2 in the radially outward direction, distanced away from the longitudinal axis 5. The second end cutting edge 36*b* forms a second angle 36*e* with respect to the plane oriented perpendicular to the axis 5. The second end cutting edge 36*b* extends to the radially outer side similar to the first end cutting edge 36*a* and is aligned with the first end cutting edge 36*a* in the axial direction. The first end cutting edge 36*a* and the second end cutting edge 36*b* are connected at an end cutting edge peak 36*c*, forming an acute angle. The first end cutting edge 36*a* and the second end cutting edge 36*b* are both positioned at a location radially inward relative to the longitudinal axis 5 than the end cutting edge peak 36*c*. The cutting edge 36 forms, for example, a dimple 46 illustrated in FIG. 29.

Figure 29:
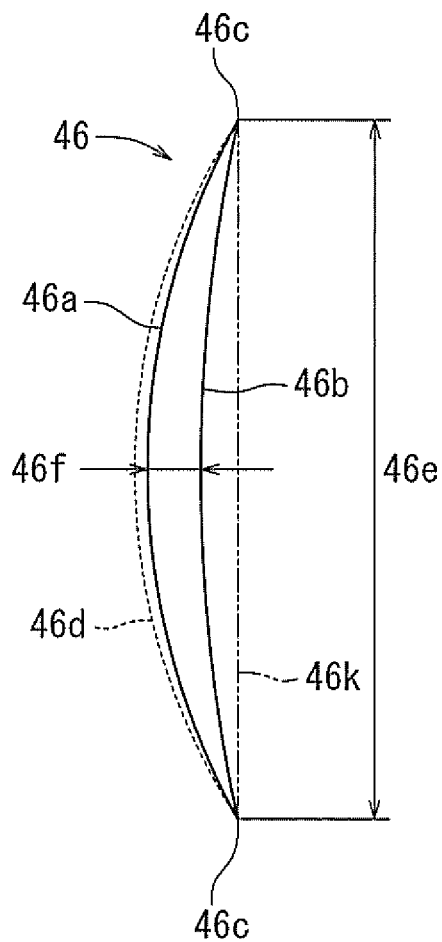
FIG. 29 is an enlarged top view of a dimple formed utilizing the rotary cutting tool of FIG. 28.

As illustrated in FIG. 29, the dimple 46 has a first side 46*a*, a second side 46*b* widthwise opposed the first side 46*a*, and two vertically opposing ends 46*c*. The first side 46*a* and the second side 46*b* are curved lines. The first side 46*a* and the second side 46*b* both bulge toward one side in the width direction. The entirety of, or at least the majority of, the first side 46*a* and the second side 46*b*, are located on one side, in one region with respect to the line 46*k* forms the vertical longest line connecting the ends 46*c*.

As illustrated in FIG. 29, the dimple 46 has a groove bottom line 46*d* connecting deepest points at each width cross-section spanning the length of each dimple 46. The groove bottom line 46d is formed from the end cutting edge peak 36c illustrated in FIG. 28. Thus, the groove bottom line 46d is positioned at a location radially outward of, and further beyond the first side 46a, compared to the region between the first side 46a and the second side 46b. Therefore, as referring to FIG. 6, when the workpiece 20 and the counter piece 30 are slidably moved, abrasion powders are generated and the dimple 46 can reliably be held in the dimple 46.

Figure 30:
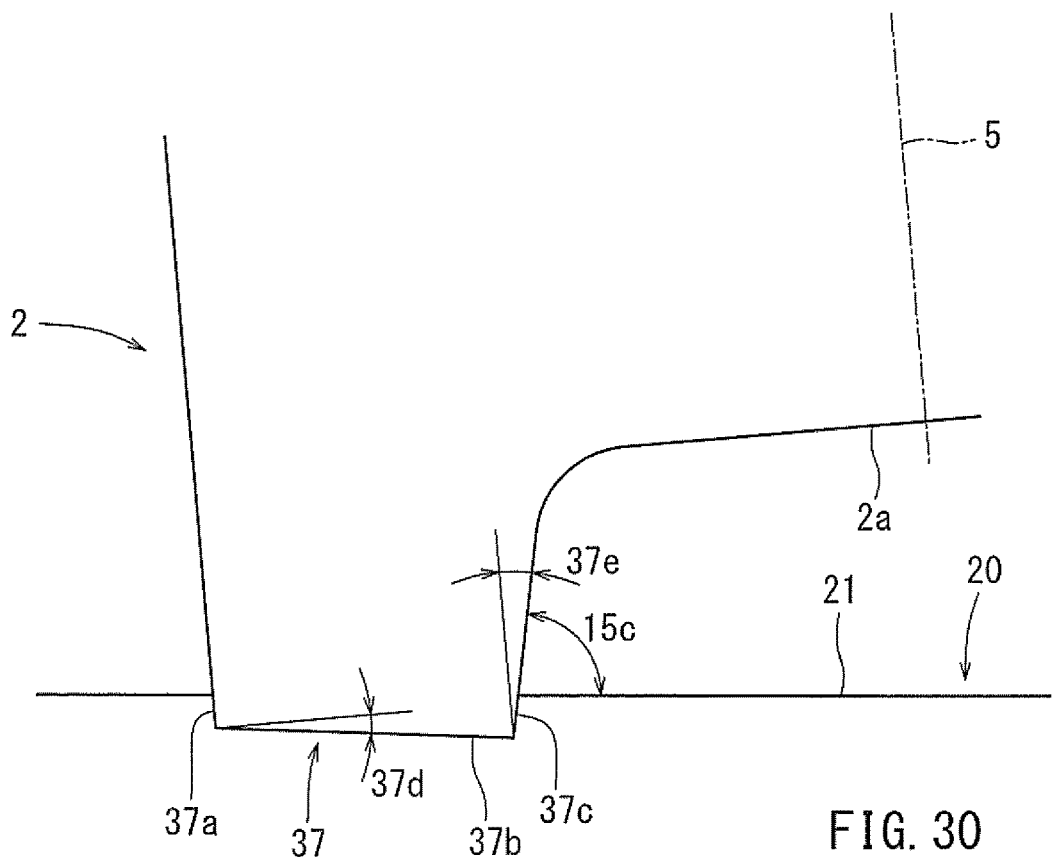
FIG. 30 is a partially enlarged front view of a leading end of an embodiment of a rotary cutting tool.

The rotary cutting tool 1 may have a cutting edge 37 illustrated in FIG. 30 as an alternative to the cutting edge 3 illustrated in FIG. 2. The cutting edge 37 is positioned at a location radially outward of, and offset from an axis 5 of a main body 2, and longitudinally axially projects in the leading direction from a leading end 2a of the main body 2. The leading end 37 has a substantially square shape; and includes a first end cutting edge 37a axially extending in the leading direction from an outer peripheral edge of the main body 2, a second end cutting edge 37b radially extending inward from a leading end of the first end cutting edge 37a, and a third end cutting edge 37c axially extending opposite to the leading direction from an inner peripheral end of the second end cutting edge 37b.

As illustrated in FIG. 30, the first end cutting edge 37a extends straight and substantially parallel to the axis 5 from the vicinity of the outer peripheral edge of the main body 2. The second end cutting edge 37b extends at a larger angle than 90 degrees with respect to the first end cutting edge 37a. The second end cutting edge 37b is positioned to be substantially parallel to the processing surface 21 when the axis 5 of the rotary cutting tool 1 is inclined at a predetermined angle 10 (see FIG. 1) with respect to a line oriented perpendicular to the processing surface 21. More specifically, and consequently, the second end cutting edge 37b is inclined at an angle 10 with respect to a plane oriented perpendicular to the axis 5.

As illustrated in FIG. 30, the third end cutting edge 37c is substantially perpendicular to the second end cutting edge 37b and extends straight from an inner peripheral end of the second end cutting edge 37b. The third end cutting edge 37c has an angle 37e with respect to a line parallel to the axis 5. The distance between the first end cutting edge 37e and the third end cutting edge 37c becomes narrower moving toward the second end cutting edge 37b, where they converge to the line parallel to the longitudinal axis 5. The cutting edge 37 forms, for example, a dimple 47 illustrated in FIG. 31.

Figure 31:
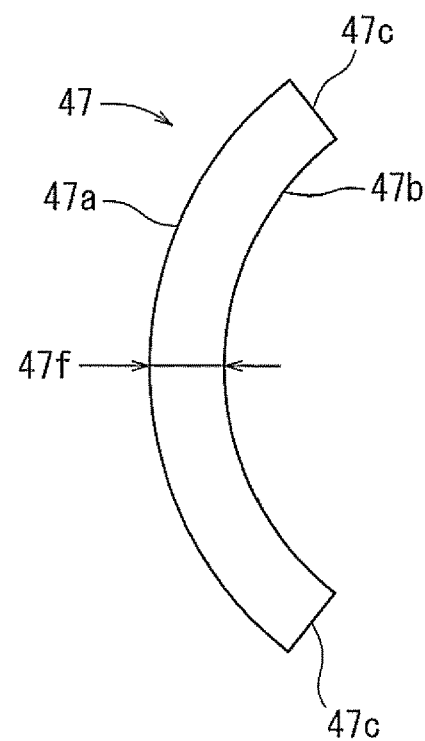
FIG. 31 is a partially enlarged top view of a dimple formed utilizing the rotary cutting tool of FIG. 30.

As illustrated in FIG. 31, the dimple 47 includes a first side 47a, a second side 47b widthwise opposed the first side 47a, and two vertically opposing ends 47c. The first side 47a and the second side 47b are curved lines. The first side 47a and the second side 47b both bulge toward one side in the width direction and are substantially parallel to each other. Therefore, the width of the dimple 47 is substantially constant and extends in a C-shape. Both of the ends 47c of the dimple 47 are substantially straight.

Figure 32:
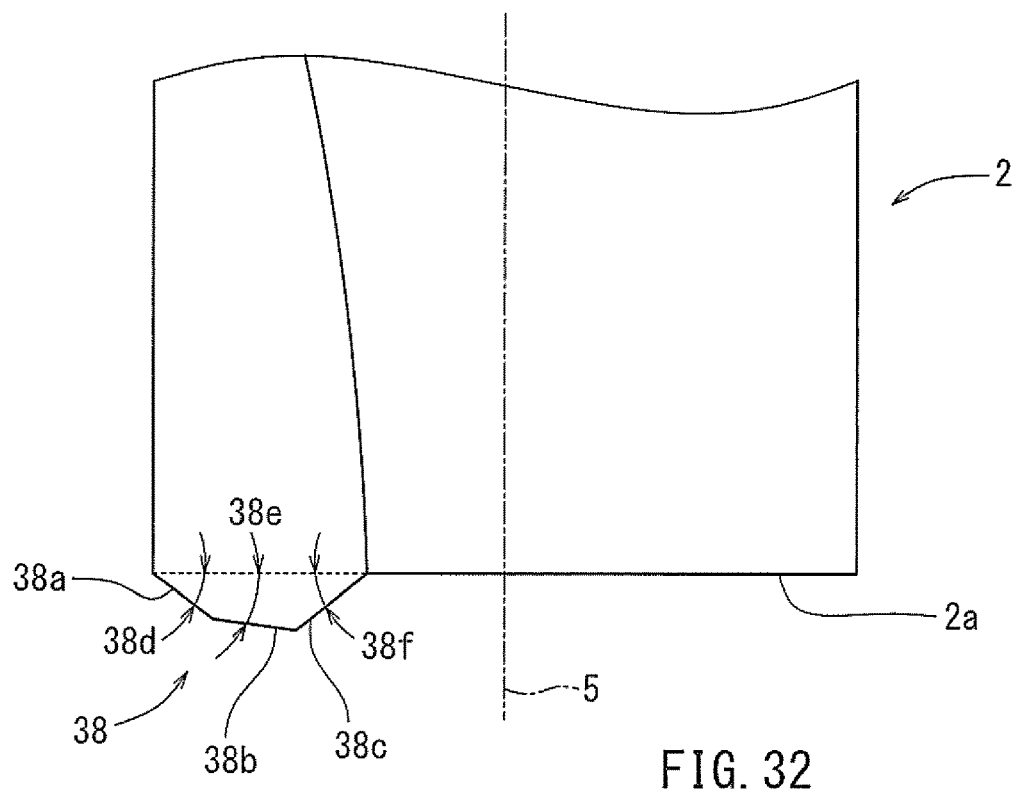
FIG. 32 is a partially enlarged front view of a leading end of an embodiment of a rotary cutting tool.

The rotary cutting tool 1 may also include a cutting edge 38 illustrated in FIG. 32 as an alternative to the cutting edge 3 illustrated in FIG. 2. The cutting edge 38 may be positioned at a location radially outward of, and offset from an axis 5 of a main body 2, and may project longitudinally axially in the leading direction from a leading end 2a of the main body 2. The cutting edge 38 has a polygonal shape; and continuously includes a first end cutting edge 38a, a second end cutting edge 38b and a third end cutting edge 38c. The first end cutting edge 38a extends straight from the vicinity of the outer peripheral edge of the main body 2 toward the longitudinal axis 5, in the downward and radially inward direction. The first end cutting edge 38a has a first angle 38d at the vicinity of the outer peripheral edge of the main body 2 with respect to the interior cross-sectional plane of tool 1 oriented perpendicular to the axis 5 at the leading end 2a.

As illustrated in FIG. 32, the second end cutting edge 38b extends straight from the leading end of the first end cutting edge 38a and further extends downward and radially inward away from the main body 2 and toward the longitudinal axis 5. The second end cutting edge 38b forms a smaller second angle 38e with respect to the plane perpendicular to the axis 5 than the first angle 38d. The third end cutting edge 38c connects the leading end of the second end cutting edge 38b and a point substantially radially inward of the radial center of the main body 2. The third end cutting edge 38c includes a third angle 38f with respect to the plane oriented perpendicular to the axis 5.

Figure 33:
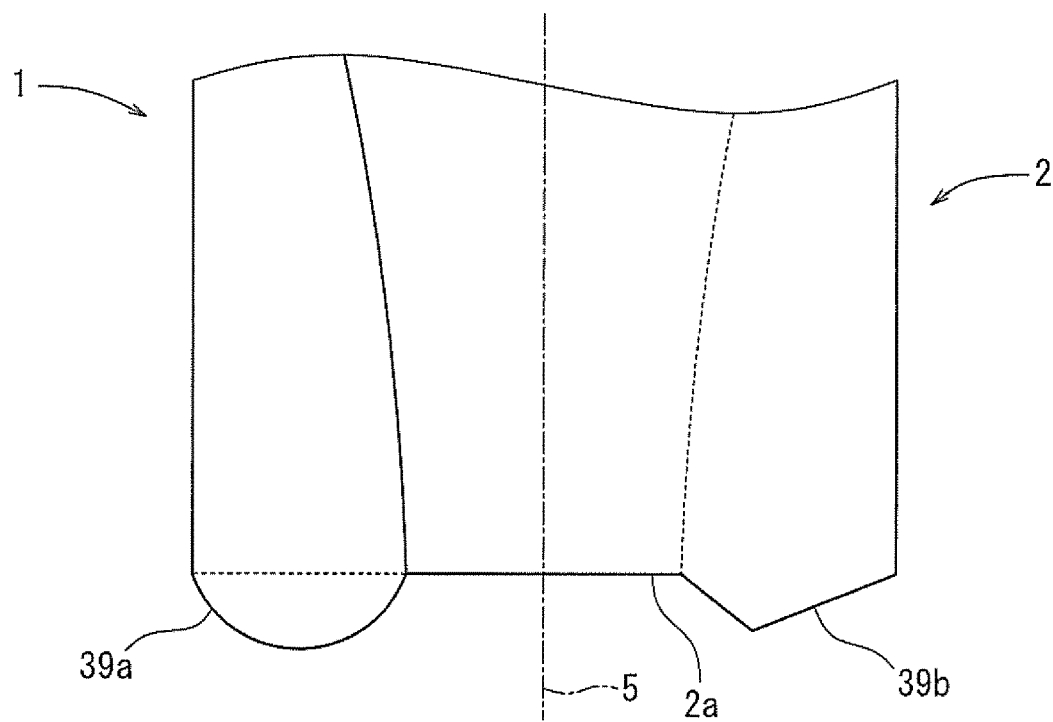
FIG. 33 is a partially enlarged front view of a leading end of an embodiment of a rotary cutting tool.

The rotary cutting tool 1 may include one cutting edge 3 as illustrated in FIG. 2 etc. or a plurality of the cutting edges 39a and 39b as illustrated in FIG. 33. The end cutting edge 39a and the end cutting edge 39b are positioned, for example, in a location opposed to each other about the longitudinal axis 5. Alternatively, the cutting edge 39a and the cutting edge 39b may be positioned, for example, to be spaced at a predetermined distance in the circumferential direction. The cutting edge 39a may be formed, for example, similar to the cutting edge 31 illustrated in FIG. 17. The cutting edge 39b may be formed, for example, similar to the cutting edge 32 illustrated in FIG. 20.

Figure 34:
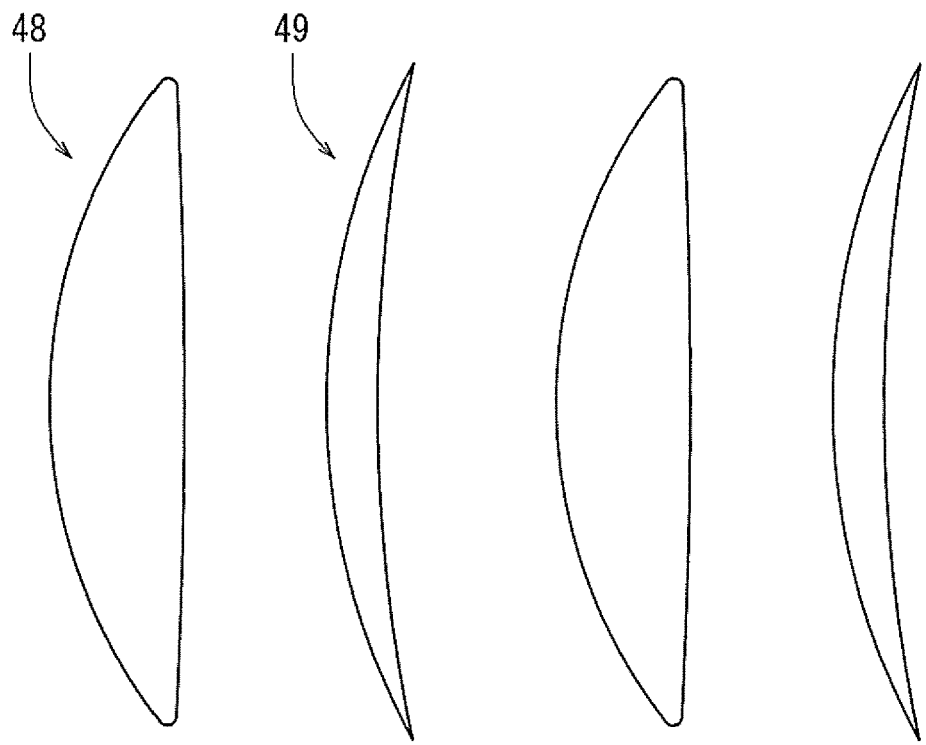
FIG. 34 is a partially enlarged top view of a workpiece including dimples formed utilizing the rotary cutting tool of FIG. 33.

By using the rotary cutting tool 1 illustrated in FIG. 33, for example, dimples 48 and 49 illustrated in FIG. 34 can be formed. For example, as illustrated in FIG. 1, the rotary cutting tool 1 is set to have a predetermined angle 10 with respect to the line oriented perpendicular to the processing surface 21. The workpiece 20 and the rotary cutting tool 1 move relative to each other while the rotary cutting tool 1 simultaneously rotates about its longitudinal axis 5. In this way, the cutting edge 39a forms the dimple 48 while the cutting edge 39b forms the dimple 49 in a synchronous manner. The dimples 48 and the dimples 49 are alternately aligned in the moving direction of the rotary cutting tool 1 relative to the workpiece 20.

As illustrated in FIG. 34, the dimple 48 has two opposing sides, wherein the two opposing sides bulge in a direction away from each other. The dimple 49 has two opposing sides, wherein the two opposing sides extend in the same direction so as to be bulged. The dimples 48 and 49 are arranged parallel to each other in a direction perpendicular to the longitudinal direction.

Figure 35:
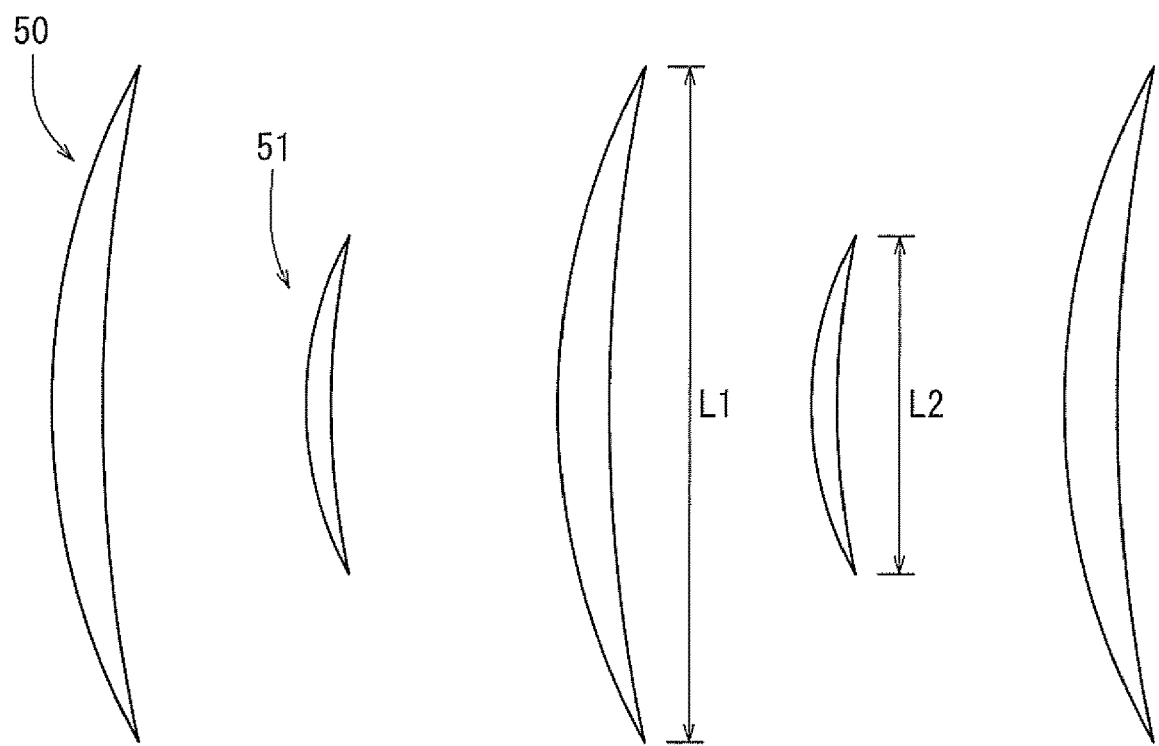
FIG. 35 is a partially enlarged top view of a workpiece including a plurality of different types of dimples.

The rotary cutting tool 1 may also be configured to form dimples 50 and 51 illustrated in FIG. 35 as an alternative to the dimples 48 and 49 illustrated in FIG. 34, and the workpiece 20 may be processed by the rotary cutting tool 1. The dimple 50 has two opposing sides and extends such that both the two opposing sides bulge in the same direction. The dimple 50 has a length L1 in the cutting direction (longitudinal direction). The dimple 51 has the similar crescent shape as that of the dimple 50 but a shorter length L2 in the cutting direction (longitudinal direction) than that of the dimple 50. The dimples 50 and 51 may be alternately arranged in a direction perpendicular to the longitudinal direction of the dimple 50, and parallel to each other.

As illustrated in FIGS. 34 and 35, the rotary cutting tool 1 can include various types of shapes of the cutting edges to form various shapes of dimples. Alternatively, a plurality of the cutting tools may be prepared, and each of the rotary cutting tools may include cutting edges with various shapes. The workpiece 20 may be processed by the plurality of the rotary cutting tools so that each shape of dimples may be formed by each rotary cutting tool.

As illustrated in FIGS. 34 and 35, the dimples may include a plurality of first dimples 48 and 50 formed by one cutting edge, and second dimples 49 and 51 which are formed by another cutting edge different from the one cutting edge and are located between the first dimples 48 and 50. Therefore, the dimples with different shapes may be alternately arranged. In this way, the friction coefficient generated due to the relative motion of the workpiece 20 to the counter piece 30 can be efficiently reduced with reference to FIG. 6.

The first dimples 48 and 50 can be formed utilizing a first rotary cutting tool and the second dimples 49 and 51 can be formed utilizing a second rotary cutting tool. In this case, it is necessary to adjust the position and the rotational angle of the second rotary cutting tool considering the position and the rotational angle of the first rotary cutting tool such that the first dimples 48, 50 and the second dimples 49, 51 are positioned in a predetermined positional relation, relative to each other. Thus, the first rotary cutting tool and the second rotary cutting tool may have a cutting edge with a different shape, at a different radial position.

Referring to FIGS. 34 and 35, the first dimples 48, 50 and the second dimples 49, 51 are formed by the cutting edges 39a and 39b having different shapes, respectively. As illustrated in FIG. 33, these cutting edges 39a and 39b may be provided as part of the same rotary cutting tool 1. In this case, the positional relation of the plurality of the cutting edges 39a and 39b may be predetermined on the rotary cutting tool 1. Thus, it is possible to easily form the dimples having different shapes as compared to the case where the relative positions of a plurality of the rotary cutting tools are controlled.

The plurality of the dimples 22 illustrated in FIG. 12 are arranged in parallel in a direction substantially perpendicular to the longitudinal direction of the dimples 22. Alternatively, the plurality of the dimples may be arranged in patterns illustrated in FIGS. 36 to 41. The plurality of the dimples 60 illustrated in FIG. 36 include first dimples 60a aligned in a row and second dimples 60b aligned in a row. The first dimples 60a are arranged such that their longitudinal direction is inclined with respect to the feed direction indicated by an arrow. The plurality of the first dimples 60a are arranged in parallel at a predetermined interval in the feed direction and their respective longitudinal directions are arranged in parallel each other.

Figure 36:
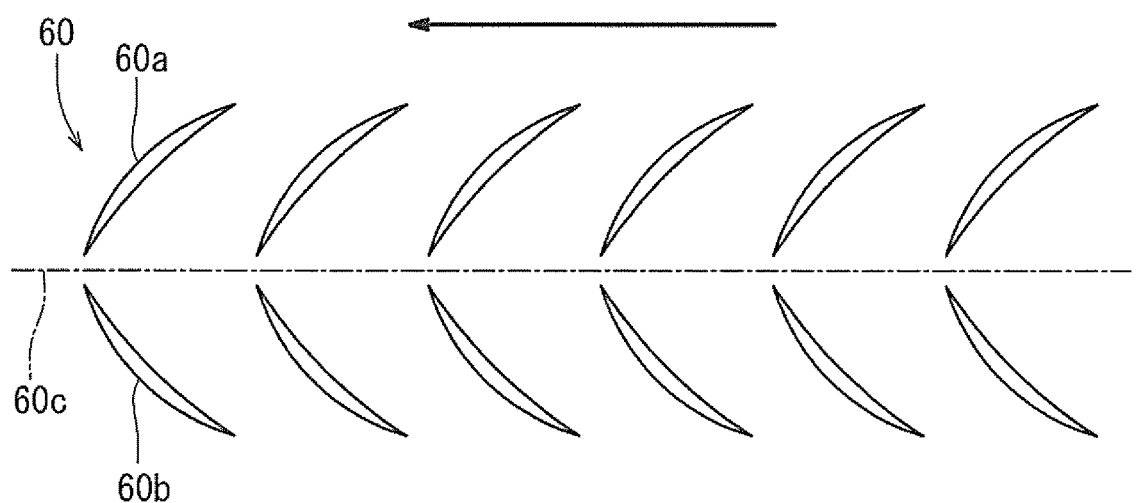
FIG. 36 is a partially enlarged top view of a workpiece including dimples arranged in an alternative pattern.

As illustrated in FIG. 36, the second dimples 60b are inclined at a different angle from that of the first dimples 60a with respect to the feed direction. The plurality of the second dimples 60b are arranged in parallel at a predetermined interval in the feed direction and longitudinal directions are also arranged in parallel each other. The second dimples 60b are located in a position and have a shape so as to be symmetrical with the first dimples 60a about a line 60c extending between the first dimples 60a aligned in a row and the second dimples 60b aligned in a row.

Figure 37:
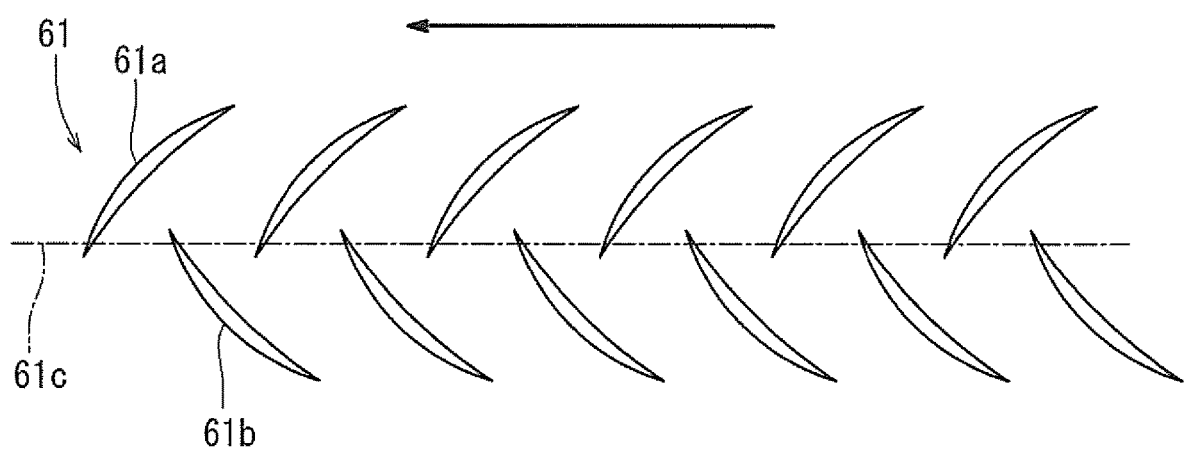
FIG. 37 is a partially enlarged top view of a workpiece including dimples arranged in an alternative pattern.

The plurality of the dimples 61 illustrated in FIG. 37 include first dimples 61a aligned in a row and second dimples 61 aligned in a row. The first dimples 61a are arranged such that the longitudinal direction is inclined with respect to the feed direction as indicated by an arrow. The plurality of the first dimples 61a are arranged in parallel at a predetermined interval in the feed direction and longitudinal directions are also arranged in parallel each other. The second dimples 61b are inclined at a different angle from that of the first dimples 61a with respect to the feed direction. For example, the second dimples 61b are inclined at an angle so as to be symmetrical with the first dimples 61a with respect to a line 61c extending between the first dimples 61a aligned in a row and the second dimples 61b aligned in a row. The plurality of the second dimples 61b are arranged in parallel at a predetermined interval in the feed direction, different from the interval of the first dimples 61a, and wherein the longitudinal directions of the plurality of second dimples 61b are arranged in parallel each other.

As illustrated in FIG. 37, the plurality of the first dimples 61a and the plurality of the second dimples 61b are arranged in an alternating manner in the feed direction as indicated by an arrow, due to their differing placement intervals in the feed direction. The positions of the first dimples 61a and the second dimples 61b in a direction perpendicular to the feed direction are determined such that they are partially overlapped when these are seen in the feed direction.

Figure 38:
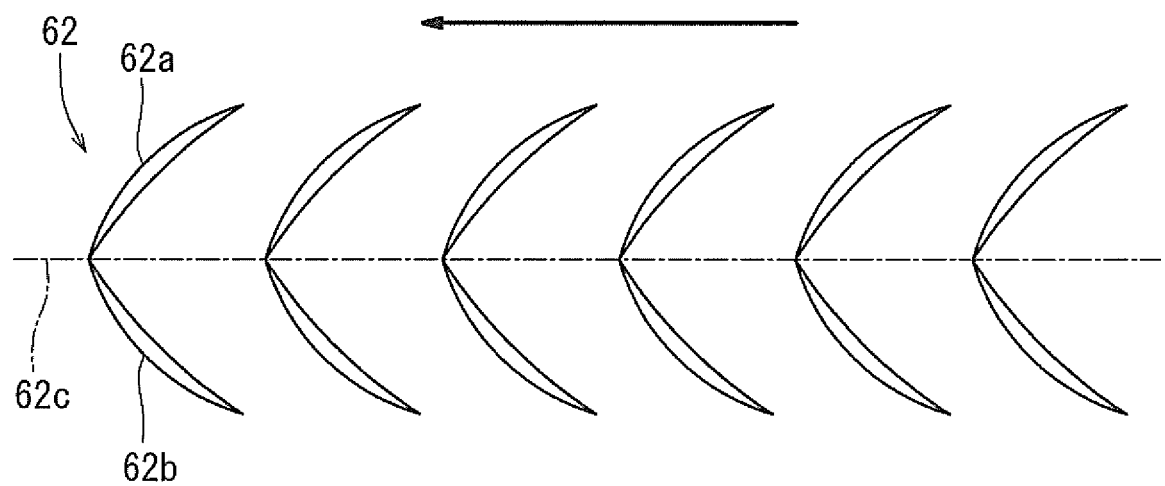
FIG. 38 is a partially enlarged top view of a workpiece including dimples arranged in an alternative pattern.

The plurality of the dimples 62 illustrated in FIG. 38 include first dimples 62a arranged in a row and second dimples 62b arranged in a row. The first dimples 62a are arranged such that the longitudinal direction is inclined to the feed direction indicated by an arrow. The plurality of the first dimples 62a are arranged in parallel at a predetermined interval in the feed direction and their respective longitudinal directions are also arranged to be in parallel to each other.

As illustrated in FIG. 38, the second dimples 62b are inclined at a different angle from that of the first dimple 62a with respect to the feed direction. The longitudinal end of each of the first dimples 62a is in contact with the longitudinal end of the second dimples 62b. The first dimples 62a and the second dimples 62b are positioned in symmetrical locations and have symmetrical angles and symmetrical shapes with respect to each other about a line 62c extending between the first dimples 62a aligned in a row and the second dimples 62b aligned in a row.

Figure 39:
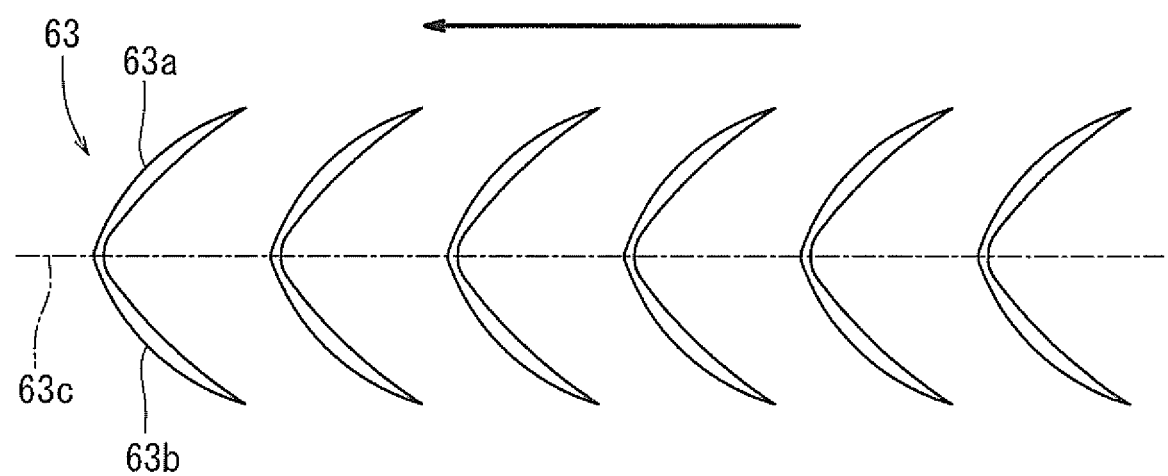
FIG. 39 is a partially enlarged top view of a workpiece including dimples arranged in an alternative pattern.

As illustrated in FIG. 39, the plurality of the dimples 63 include first dimples 63a aligned in a row and second dimples 63b aligned in a row. The first dimples 63a are arranged such that their respective longitudinal directions are inclined with respect to the feed direction indicated by an arrow. The plurality of the first dimples 63a are arranged in parallel to each other at a predetermined interval in the feed direction and their respective longitudinal directions are arranged to be in parallel to each other.

As illustrated in FIG. 39, the second dimples 62b are inclined at a different angle from that of the first dimple 62a with respect to the feed direction. The longitudinal end of the first dimples 62a and the longitudinal end of the second dimples 62b partially overlap. As a result, the first dimples 63a and the second dimples 63b are made to be continuous in the vertical direction. The first dimples 63a and the second dimples 63b are positioned in symmetrical locations and have symmetrical angles and symmetrical shapes with respect to each other about a line 63c extending between the first dimples 63a aligned in a row and the second dimples 63b aligned in a row.

Figure 40:
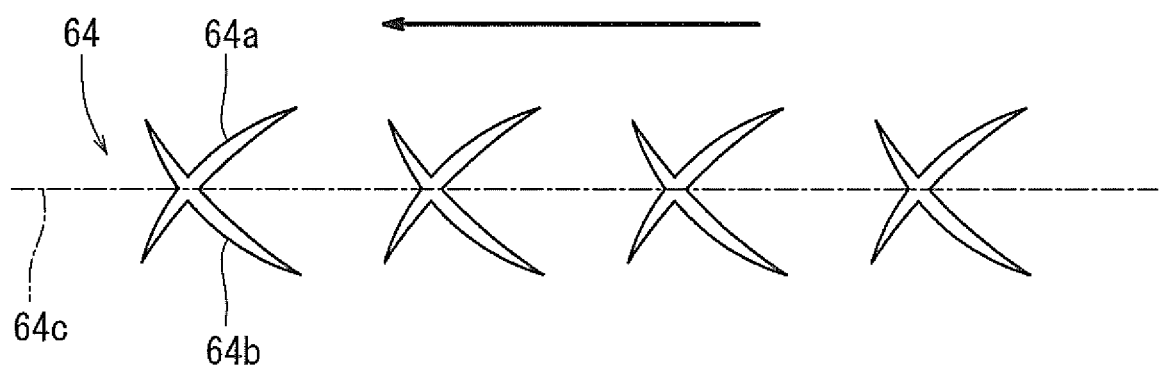
FIG. 40 is a partially enlarged top view of a workpiece including dimples arranged in an alternative pattern.

The plurality of the dimples 64 illustrated in FIG. 40 include first dimples 64a aligned in a row and second dimples 64b aligned in a row. The first dimples 64a are arranged such that their longitudinal direction is inclined with respect to the feed direction as indicated by an arrow. The plurality of the first dimples 64a are arranged in parallel at a predetermined interval in the feed direction and their respective longitudinal directions are arranged in parallel to each other.

As illustrated in FIG. 40, the second dimples 64b are inclined at a different angle from that of the first dimples 64a with respect to the feed direction and therefore intersect with the first dimples 64a. The first dimples 64a and the second dimples 64b are positioned in symmetrical locations and have symmetrical angles and symmetrical shapes with respect to each other about a line 64c that connects intersecting points.

Figure 41:
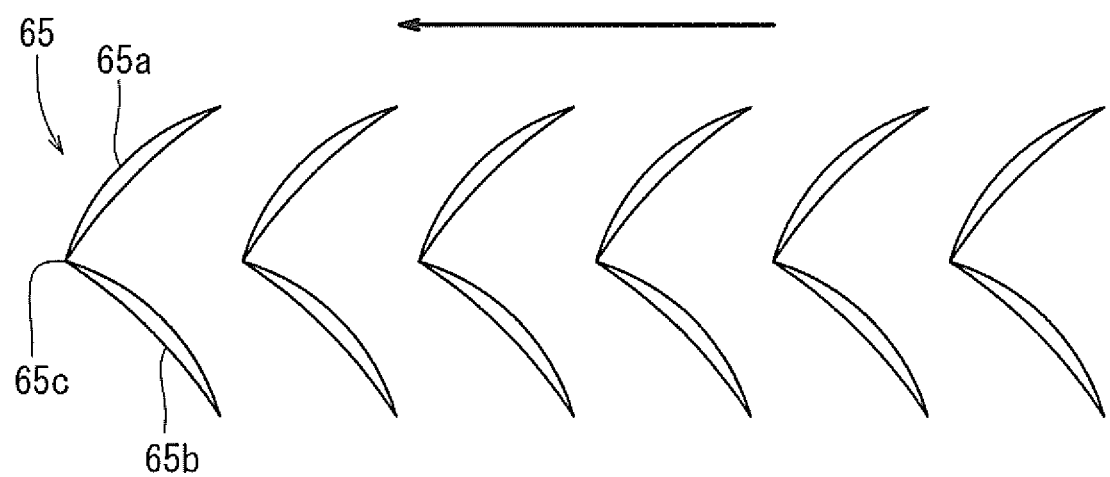
FIG. 41 is a partially enlarged top view of a workpiece including dimples arranged in an alternative pattern.

The plurality of the dimples 65 illustrated in FIG. 41 include first dimples 65a aligned in a row and second dimples 65b aligned in a row. The first dimples 65a are arranged such that their longitudinal directions are inclined with respect to the feed direction as indicated by an arrow. The plurality of the first dimples 65a are arranged in parallel at a predetermined interval in the feed direction and their respective longitudinal directions are arranged to be in parallel to each other.

As illustrated in FIG. 41, the second dimples 65b are inclined at a different angle from that of the first dimples 65a with respect to the feed direction. Each of the longitudinal ends of the first dimples 65a and each of the longitudinal ends of the second dimples 65b are in contact with each other at a common point 65c. The second dimples 65b have such a positional relation and a shape that corresponds to that of the first dimples 65a if rotated about the common point 65c.

The cutting edge 3 illustrated in FIG. 2 etc. is provided in the vicinity of the outer peripheral edge of the main body 2. Alternatively, the cutting edge may be provided in the vicinity of the radial center of the main body 2. The cutting edge 3 illustrated in FIG. 1 is positioned in a location where the entirety of the cutting edge 3 is radially offset from the axis 5. Alternatively, the end cutting edge 3 may be positioned in a location offset from the axis 5 while at least a part of the cutting edge 3 is located on the axis 5.

The cutting edge may have a triangular end cutting edge illustrated in FIG. 2 etc., or it may have a circular-arc end cutting edge illustrated in FIG. 17 etc. Alternatively, the cutting edge may have an end cutting edge having a shape in combination with a free curved line and various shapes. The rake face of the cutting edge may be parallel to the axis or be inclined to a plane parallel to the axis.

The plurality of the dimples may be completely distanced from each other as illustrated in FIG. 12 or the second dimples may be distanced from other second dimples while collectively partially overlapped with the first dimples as illustrated in FIG. 39. The dimples may be aligned at equal intervals as illustrated in FIG. 12 or may also be aligned at unequal intervals.

The rotary cutting tool 1 may have one cutting edge 3 as illustrated in FIG. 2 or may also have two cutting edges 39a and 39b as illustrated in FIG. 33. Alternatively, the rotary cutting tool 1 may have more than three cutting edges, which are radially spaced apart at the leading end.

The main body 2 of the rotary cutting tool 1 may have a round rod shape as illustrated in FIG. 1 or a rod with a polygonal shape in a cross-section or the like.

The processing surface 21 may be a flat surface as illustrated in FIG. 1, or may have a cylindrical or columnar outer peripheral surface or inner peripheral surface as illustrated in FIG. 15. For example, dimples may be formed on an outer peripheral surface of an axis of a journal bearing. Dimples may be formed on an inner peripheral surface of a bearing. Dimples may be formed on components for a pump, which perform a rotary motion. Dimples may be formed on an outer peripheral surface of a skirt for a piston.

As illustrated in FIG. 9, the rotary cutting tool 1 and the workpiece 20 may be relatively delivered or oriented by rotating the workpiece 20 with respect to the rotary cutting tool 1. Alternatively, the rotary cutting tool 1 and the workpiece 20 may be delivered or oriented by moving the rotary cutting tool 1 with respect to the workpiece 20, for example, in the circumferential direction. A rotating speed of the workpiece is slower than the cutting speed of the cutting edge, wherein cutting speed is determined by the rotational speed of the rotary cutting tool 1, which is, for example, 1 to 20 m/min. etc.

The various examples described above in detail with reference to the attached drawings are intended to be representative of the invention and are thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved rotary cutting tool and/or methods of making and using the same.

The invention claimed is:

1. A method for forming dimples on a workpiece with a rotary cutting tool, the dimples each having: a respective first inclined surface inclined relative to a processing surface of the workpiece, and a respective second inclined surface inclined relative to the processing surface, the method comprising:

provide a rotary cutting tool including a first cutting edge and a second cutting edge, the first cutting edge and the second cutting edge projecting axially from a leading end face of a rod-shaped main body and being configured to form two sides of a triangle, wherein a plane of the leading end face forms the third side of the triangle, and wherein the first cutting edge and the second cutting edge are radially offset from a longitudinal axis of the rotary cutting tool;

orienting the rotary cutting tool such that the longitudinal axis of the rotary cutting tool is inclined at an acute angle with respect to a line oriented perpendicular to the processing surface of the workpiece; and moving the rotary cutting tool along the processing surface while rotating the rotary cutting tool about the longitudinal axis of the rotary cutting tool while cutting the processing surface with the first cutting edge and with the second cutting edge to form spaced apart dimples on the processing surface, such that the first inclined surfaces of the dimples are cut with the first cutting edge and the second inclined surfaces of the dimples are cut with the second cutting edge.

2. The method of claim 1, wherein for cutting each of the dimples, the cutting edges start cutting from a respective cutting start point with respect to the processing surface and move away from the processing surface at a respective cutting terminal point based on the rotation of the rotary cutting tool about the longitudinal axis, wherein each of the dimples includes a respective first side and a respective second side facing each other in a direction perpendicular to a respective connecting line connecting the corresponding cutting start point and the corresponding cutting terminal point, wherein each of the first sides on the processing surface curves so as to bulge in one direction with respect to the corresponding connecting line, and wherein each of the second sides on the processing surface extends along the corresponding connecting line or wherein each of the second sides on the processing surface curves so as to bulge in the one direction.

3. The method of claim 1, wherein the rotary cutting tool is oriented such that the longitudinal axis of the rotary cutting tool has an inclination angle less than or equal to 60 degrees with respect to the line perpendicular to the processing surface of the workpiece.

4. The method of claim 1, wherein each of the dimples has:
   a respective length measured along a cutting direction of the rotary cutting tool;
   a respective maximum width measured in a direction perpendicular to the cutting direction, wherein the respective maximum width is less than the respective length; and
   a respective maximum depth that is less than or equal to 10% of the respective length.

5. The method of claim 1, wherein each of the dimples has a respective length measured along a cutting direction of the rotary cutting tool, a respective width measured perpendicular to the cutting direction, and a respective depth groove bottom line connecting the deepest points at each width, wherein the respective groove bottom line is offset from the respective center of the respective width.

6. The method of claim 1, wherein the dimples include a plurality of first dimples formed by the first and second cutting edges, and wherein a plurality of second dimples are formed by a third cutting edge different from the first and second cutting edges, wherein the plurality of second dimples are positioned between the plurality of first dimples.

7. The method of claim 6, wherein the first cutting edge, the second cutting edge, and the third cutting edge are all provided on the same rotary cutting tool.

8. A method for forming dimples on a workpiece with a rotary cutting tool having a longitudinal axis, the dimples each having: a respective first inclined surface inclined relative to a processing surface of the workpiece, and a respective second inclined surface inclined relative to the processing surface, the method comprising:
   providing a rotary cutting tool, where the tool includes a columnar body with a first cutting edge and a second edge both projecting axially from a leading end face of a rod-shaped main body, the first cutting edge and the second cutting edge being configured to form two sides of a triangle, wherein a plane of the leading end face forms the third side of the triangle, and wherein the first cutting edge and the second cutting edge are both radially offset from the longitudinal axis;
   setting the rotary cutting tool such that the longitudinal axis of the rotary cutting tool is inclined at an acute angle with respect to a line oriented perpendicular to the processing surface of the workpiece; and
   moving the rotary cutting tool relative to the processing surface while the rotary cutting tool is rotated about the longitudinal axis while cutting the processing surface with the first cutting edge and with the second cutting edge to form spaced apart dimples on the processing surface, such that the first inclined surfaces of the dimples are cut with the first cutting edge and the second inclined surfaces of the dimples are cut with the second cutting edge.

9. The method of claim 8, wherein for cutting each of the dimples, the cutting edges start cutting from a respective cutting start point with respect to the processing surface and move away from the processing surface at a respective cutting terminal point as the rotary cutting tool rotates about the longitudinal axis,
   wherein each of the dimples includes a respective first side and a respective second side facing each other in a direction perpendicular to a respective connecting line connecting the corresponding cutting start point and the corresponding cutting terminal point,
   wherein each of the first sides curves so as to bulge in one direction with respect to the corresponding connecting line, and
   wherein each of the second side extends along the corresponding connecting line or wherein each of the second sides on the processing surface curves so as to bulge in the one direction.

10. The method of claim 8, wherein the rotary cutting tool is set such that the longitudinal axis of the rotary cutting tool has an inclination angle of less than or equal to 60 degrees with respect to the line oriented perpendicular to the processing surface of the workpiece.

11. The method of claim 8, wherein each of the dimples has:
   a respective length measured along a cutting direction of the rotary cutting tool;
   a respective maximum width measured in a direction perpendicular to the cutting direction, wherein the respective maximum width is less than the respective length; and
   a respective maximum depth that is less than or equal to 10% of the respective length.

12. The method of claim 11, wherein the maximum width of each dimple is less than the length of each dimple, wherein the length corresponds to a vertical span of each dimple.

13. The method of claim 11, wherein the maximum width of each dimple is less than half the length of each dimple, wherein the length corresponds to a vertical span of each dimple.

14. The method of claim 8, wherein each of the dimples has a respective length measured along a cutting direction of the rotary cutting tool, a respective width measured perpendicular to the cutting direction, and a respective depth groove bottom line connecting the deepest points at each width, wherein the respective groove bottom line is offset from the respective center of the respective width.

15. The method of claim 8, wherein the dimples include a plurality of first dimples formed by the first and second cutting edges, and wherein a plurality of second dimples are formed by a third cutting edge different from the first and second cutting edges, wherein the plurality of second dimples are located between the plurality of first dimples.

16. The method of claim 15, wherein the first cutting edge, the second cutting edge, and the third cutting edge are all provided on the same rotary cutting tool.

17. The method of claim 8, wherein the rotary cutting tool is set such that that the first cutting edge and the second cutting edge are oriented at the same inclination angle with respect to the leading end face.

18. The method of claim 17, wherein the rotary cutting tool is set such that the longitudinal axis of the rotary cutting tool is inclined counter-clockwise relative to the line oriented perpendicular to the processing surface of the workpiece.

19. The method of claim 18, wherein the inclination of the longitudinal axis of the rotary cutting tool in the counter-clockwise direction relative to the line oriented perpendicular to the processing surface of the workpiece is at an angle less than or equal to 60 degrees.

20. A method for forming dimples on a workpiece with a rotary cutting tool having a longitudinal axis, the dimples each having: a respective first inclined surface inclined relative to a processing surface of the workpiece, and a respective second inclined surface inclined relative to the processing surface, the method comprising:

providing a rotary cutting tool, wherein the tool includes a columnar body with a first cutting edge and a second cutting edge both projecting axially from a leading end face of a rod-shaped main body, wherein the first cutting edge and the second cutting edge are both radially offset from the longitudinal axis of the rotary cutting tool, wherein the first cutting edge and the second cutting edge are configured to form two sides of a triangle, and wherein a plane of the leading end face forms the third side of the triangle;

setting the rotary cutting tool such that the longitudinal axis of the rotary cutting tool is inclined at an acute angle with respect to a line oriented perpendicular to the processing surface of the workpiece, wherein the processing surface is flat; and moving the rotary cutting tool along the processing surface while rotating the rotary cutting tool about the axis of the rotary cutting tool while cutting the processing surface with the first cutting edge and with the second cutting edge to form spaced apart dimples on the processing surface, such that the first inclined surfaces of the dimples are cut with the first cutting edge and the second inclined surfaces of the dimples are cut with the second cutting edge.

* * * * *